United States Patent
Challa et al.

(10) Patent No.: US 11,871,469 B2
(45) Date of Patent: Jan. 9, 2024

(54) TECHNIQUES FOR TRIGGERING RADIO ACCESS TECHNOLOGY (RAT) FALL BACK AT A USER EQUIPMENT (EU) BASED ON DATA TRAFFIC INFORMATION

(71) Applicant: QUALCOMM Incorporated, San Diego, CA (US)

(72) Inventors: Nikhil Challa, San Diego, CA (US); Mahesh Kommi, San Diego, CA (US); Anil Rao, San Diego, CA (US); Nishith Chaubey, San Diego, CA (US); Heekab Shin, San Diego, CA (US); Brian Danque, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 16/989,694

(22) Filed: Aug. 10, 2020

(65) Prior Publication Data

US 2022/0046738 A1 Feb. 10, 2022

(51) Int. Cl.
*H04W 76/18* (2018.01)
*H04L 41/0668* (2022.01)
(Continued)

(52) U.S. Cl.
CPC .............. *H04W 76/18* (2018.02); *G06N 5/04* (2013.01); *G06N 20/00* (2019.01);
(Continued)

(58) Field of Classification Search
CPC . H04W 76/18; H04W 72/0406; H04W 76/16; H04W 88/06; H04L 41/0668
See application file for complete search history.

(56) References Cited

U.S. PATENT DOCUMENTS 10,609,608 B2 3/2020 Park et al.
2013/0150032 A1* 6/2013 Pattaswamy ...... H04W 52/0229
455/434
(Continued)

FOREIGN PATENT DOCUMENTS

EP 3550888 A1 10/2019

OTHER PUBLICATIONS

International Search Report and Written Opinion—PCT/US2021/041430—ISA/EPO—dated Dec. 3, 2021 (194559WO).
(Continued)

*Primary Examiner* — Ricky Q Ngo
*Assistant Examiner* — Stephen N Steiner
(74) *Attorney, Agent, or Firm* — Dalei Dong; Holland & Hart LLP

(57) ABSTRACT

Methods, systems, and devices for wireless communications are described. In some systems, a user equipment (UE) may support multiple radio access technologies (RATs). The UE may communicate using both a Long Term Evolution (LTE) connection for control signaling and a New Radio (NR) connection for data signaling in a non-standalone (NSA) mode. However, if the UE uses a data rate below a threshold, the NR connection may be inefficient. To reduce processing overhead, the UE may fall back to using the LTE connection for data communications. For example, the UE may delay or abort adding an NR connection based on the data rate. In some examples, the UE may transmit a fake report or a fake uplink message to trigger dropping an NR connection. Additionally or alternatively, the UE may indicate a preferred mode of operation to the network indicating a preference for communicating data via an LTE connection.

26 Claims, 15 Drawing Sheets

(51) Int. Cl.
*H04W 24/08* (2009.01)
*H04W 24/10* (2009.01)
*H04W 56/00* (2009.01)
*H04W 76/16* (2018.01)
*H04W 72/20* (2023.01)
*H04W 88/06* (2009.01)
*G06N 20/00* (2019.01)
*G06N 5/04* (2023.01)

(52) U.S. Cl.
CPC ......... *H04L 41/0668* (2013.01); *H04W 24/08* (2013.01); *H04W 24/10* (2013.01); *H04W 56/001* (2013.01); *H04W 72/20* (2023.01); *H04W 76/16* (2018.02); *H04W 88/06* (2013.01)

(56) References Cited

U.S. PATENT DOCUMENTS

| | | | |
|---|---|---|---|
| 2015/0043492 | A1 | 2/2015 | Baek et al. |
| 2019/0166553 | A1 | 5/2019 | Ryoo et al. |
| 2019/0342148 | A1 | 11/2019 | Hong et al. |
| 2020/0092926 | A1* | 3/2020 | Li ........................ H04W 8/005 |
| 2020/0137819 | A1 | 4/2020 | Shi et al. |
| 2020/0169934 | A1 | 5/2020 | Sundararajan et al. |
| 2020/0383027 | A1* | 12/2020 | Venkataraman .. H04W 36/0094 |

OTHER PUBLICATIONS

Partial International Search Report—PCT/US2021/041430—ISA/EPO—dated Oct. 12, 2021 (194559WO).

\* cited by examiner

TECHNIQUES FOR TRIGGERING RADIO ACCESS TECHNOLOGY (RAT) FALL BACK AT A USER EQUIPMENT (EU) BASED ON DATA TRAFFIC INFORMATION

FIELD OF DISCLOSURE

The present disclosure, for example, relates to wireless communications systems, and more specifically to techniques for triggering radio access technology (RAT) fall back at a user equipment (UE) based on data traffic information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support dual connectivity (DC) between different radio access technologies (RATs), such as LTE and NR. For example, when operating in a non-standalone (NSA) mode, a UE may communicate with the network via both an LTE connection (e.g., for control signaling) and an NR connection (e.g., for data signaling). However, in some cases, maintaining both an LTE connection and an NR connection concurrently may be inefficient for a UE. For example, keeping both LTE and NR protocol stacks active at a UE may use a significant power overhead without significantly improving performance, especially if the data transfer rate for the UE is relatively low.

SUMMARY

The present disclosure relates to improved methods, systems, devices, and apparatuses that support techniques for triggering radio access technology (RAT) fall back at a user equipment (UE) based on data traffic information. For example, the present disclosure provides for a UE to reduce processing overhead by falling back from a non-standalone (NSA) mode (e.g., implementing dual connectivity (DC) between a Long Term Evolution (LTE) connection and a New Radio (NR) connection) to an LTE connection when data transfer for the UE is below a threshold value. For example, a UE maintaining an NR connection for data signaling in a DC mode may be inefficient if the rate of data transfer is relatively low. To reduce processing overhead, the UE may fall back to using the LTE connection for data signaling. In some examples, the UE may delay or abort adding an NR connection based on the data rate—or estimated data rate—falling below a data rate threshold. In some examples, the UE may transmit a fake report or a fake uplink message (e.g., indicating poor NR connection quality) to trigger the network to drop an NR connection and allow the UE to fall back to an LTE connection. Additionally or alternatively, the UE may transmit a message indicating a preferred mode of operation to the network indicating a preference for communicating data via an LTE connection or via an NR connection in an NSA mode. Such processes may allow the UE to trigger RAT fall back based on data traffic information, supporting power savings at the UE.

A method for wireless communications at a UE is described. The method may include establishing a first connection with a first cell using a first RAT, receiving a request message to add a second connection with a second cell using a second RAT different from the first RAT, determining to perform data transfer via the first connection using the first RAT based on data traffic information for the UE, and delaying establishing the second connection with the second cell using the second RAT for at least a time duration based on determining to perform the data transfer via the first connection using the first RAT.

An apparatus for wireless communications at a UE is described. The apparatus may include a processor, memory coupled with the processor, and instructions stored in the memory. The instructions may be executable by the processor to cause the apparatus to establish a first connection with a first cell using a first RAT, receive a request message to add a second connection with a second cell using a second RAT different from the first RAT, determine to perform data transfer via the first connection using the first RAT based on data traffic information for the UE, and delay establishing the second connection with the second cell using the second RAT for at least a time duration based on determining to perform the data transfer via the first connection using the first RAT.

Another apparatus for wireless communications at a UE is described. The apparatus may include means for establishing a first connection with a first cell using a first RAT, receiving a request message to add a second connection with a second cell using a second RAT different from the first RAT, determining to perform data transfer via the first connection using the first RAT based on data traffic information for the UE, and delaying establishing the second connection with the second cell using the second RAT for at least a time duration based on determining to perform the data transfer via the first connection using the first RAT.

A non-transitory computer-readable medium storing code for wireless communications at a UE is described. The code may include instructions executable by a processor to establish a first connection with a first cell using a first RAT, receive a request message to add a second connection with a second cell using a second RAT different from the first RAT, determine to perform data transfer via the first connection using the first RAT based on data traffic information for the UE, and delay establishing the second connection with the second cell using the second RAT for at least a time duration based on determining to perform the data transfer via the first connection using the first RAT.

In some examples of the method, apparatuses, and non-transitory computer-readable medium described herein, delaying establishing the second connection may include operations, features, means, or instructions for transmitting, in response to the request message, a failure message indicating a failure to add the second connection with the second cell using the second RAT based on determining to perform the data transfer via the first connection using the first RAT.

Some examples of the method, apparatuses, and non-transitory computer-readable medium described herein may further include operations, features, means, or instructions for receiving one or more additional request messages to add the second connection with the second cell using the second RAT based on the failure message, determining that a number of additional request messages of the one or more additional request messages satisfies a threshold number of request messages, establishing the second connection with the second cell using the second RAT based on the number of additional request messages satisfying the threshold number of request messages, and operating in a DC mode for the first RAT and the second RAT based on the established first connection and the established second connection.

In some examples of the method, apparatuses, and non-transitory computer-readable medium described herein, delaying establishing the second connection may include operations, features, means, or instructions for delaying a search process for the second cell, an acquisition process for the second cell, or both for the time duration based on determining to perform the data transfer via the first connection using the first RAT, and performing the data transfer via the first connection using the first RAT during the time duration.

Some examples of the method, apparatuses, and non-transitory computer-readable medium described herein may further include operations, features, means, or instructions for activating a timer based on receiving the request message, where the timer runs for the time duration, performing the search process for the second cell, the acquisition process for the second cell, or both based on an expiry of the timer, establishing the second connection with the second cell using the second RAT based on performing the search process for the second cell, the acquisition process for the second cell, or both, and operating in a DC mode for the first RAT and the second RAT based on the established first connection and the established second connection.

Some examples of the method, apparatuses, and non-transitory computer-readable medium described herein may further include operations, features, means, or instructions for estimating a data traffic pattern for the UE based on the data traffic information for the UE for a preceding time period and comparing the estimated data traffic pattern to a data rate threshold, where determining to perform the data transfer via the first connection using the first RAT may be based on the estimated data traffic pattern failing to satisfy the data rate threshold.

Some examples of the method, apparatuses, and non-transitory computer-readable medium described herein may further include operations, features, means, or instructions for analyzing radio link control (RLC) data, packet data convergence protocol (PDCP) data, application layer data traffic for one or more applications running at the UE, or a combination thereof to determine the data traffic information for the UE for the preceding time period.

In some examples of the method, apparatuses, and non-transitory computer-readable medium described herein, estimating the data traffic pattern for the UE further may include operations, features, means, or instructions for inputting at least the application layer data traffic as an input to a machine-learned model and receiving, as an output of the machine-learned model, the estimated data traffic pattern, a decision metric indicating to perform the data transfer via the first connection using the first RAT, or a combination thereof.

In some examples of the method, apparatuses, and non-transitory computer-readable medium described herein, the input to the machine-learned model includes an uplink traffic amount, a downlink traffic amount, a data streaming type, location information for the UE, an antenna configuration for the UE, a UE capability for the UE, thermal information for the UE, screen usage information for the UE, or a combination thereof.

Some examples of the method, apparatuses, and non-transitory computer-readable medium described herein may further include operations, features, means, or instructions for identifying a criterion for performing the data transfer via the first connection using the first RAT, an indication of the time duration, or a combination thereof based on a radio resource control (RRC) configuration message, a downlink control information (DCI) message, a pre-configuration for the UE, or a combination thereof.

A method for wireless communications at a UE is described. The method may include establishing, with a network, a first connection with a first cell using a first RAT and a second connection with a second cell using a second RAT different from the first RAT, performing data transfer via the second connection using the second RAT, determining to fall back to perform the data transfer via the first connection using the first RAT based on data traffic information for the UE, measuring a value for reporting to the network, modifying the measured value based on determining to fall back to performing the data transfer via the first connection using the first RAT, and transmitting, to the network, a measurement report indicating the modified measured value.

An apparatus for wireless communications at a UE is described. The apparatus may include a processor, memory coupled with the processor, and instructions stored in the memory. The instructions may be executable by the processor to cause the apparatus to establish, with a network, a first connection with a first cell using a first RAT and a second connection with a second cell using a second RAT different from the first RAT, perform data transfer via the second connection using the second RAT, determine to fall back to perform the data transfer via the first connection using the first RAT based on data traffic information for the UE, measure a value for reporting to the network, modify the measured value based on determining to fall back to performing the data transfer via the first connection using the first RAT, and transmit, to the network, a measurement report indicating the modified measured value.

Another apparatus for wireless communications at a UE is described. The apparatus may include means for establishing, with a network, a first connection with a first cell using a first RAT and a second connection with a second cell using a second RAT different from the first RAT, performing data transfer via the second connection using the second RAT, determining to fall back to perform the data transfer via the first connection using the first RAT based on data traffic information for the UE, measuring a value for reporting to the network, modifying the measured value based on determining to fall back to performing the data transfer via the first connection using the first RAT, and transmitting, to the network, a measurement report indicating the modified measured value.

A non-transitory computer-readable medium storing code for wireless communications at a UE is described. The code may include instructions executable by a processor to establish, with a network, a first connection with a first cell using a first RAT and a second connection with a second cell using a second RAT different from the first RAT, perform data transfer via the second connection using the second RAT, determine to fall back to perform the data transfer via the first connection using the first RAT based on data traffic information for the UE, measure a value for reporting to the network, modify the measured value based on determining to fall back to performing the data transfer via the first connection using the first RAT, and transmit, to the network, a measurement report indicating the modified measured value.

Some examples of the method, apparatuses, and non-transitory computer-readable medium described herein may further include operations, features, means, or instructions for receiving a synchronization signal block (SSB) for the second RAT, where the measuring may include operations, features, means, or instructions for measuring a channel quality value for the SSB, the modifying may include operations, features, means, or instructions for decreasing the measured channel quality value based on determining to fall back to performing the data transfer via the first connection using the first RAT, and the transmitting may include operations, features, means, or instructions for transmitting an SSB measurement report indicating the decreased measured channel quality value.

In some examples of the method, apparatuses, and non-transitory computer-readable medium described herein, the channel quality value includes a reference signal received quality (RSRQ), a signal-to-noise ratio (SNR), a signal-to-interference-plus-noise ratio (SINR), or a combination thereof.

Some examples of the method, apparatuses, and non-transitory computer-readable medium described herein may further include operations, features, means, or instructions for receiving a channel state information (CSI) reference signal (RS) for the second RAT, where the measuring may include operations, features, means, or instructions for determining an indicator value for the CSI-RS, the modifying may include operations, features, means, or instructions for decreasing the indicator value based on determining to fall back to performing the data transfer via the first connection using the first RAT, and the transmitting may include operations, features, means, or instructions for transmitting a CSI measurement report indicating the decreased indicator value.

In some examples of the method, apparatuses, and non-transitory computer-readable medium described herein, the indicator value includes a channel quality indicator (CQI) value, a rank indicator (RI) value, or a combination thereof.

In some examples of the method, apparatuses, and non-transitory computer-readable medium described herein, the measuring may include operations, features, means, or instructions for measuring an amount of pending uplink data in a buffer, the modifying may include operations, features, means, or instructions for decreasing the measured amount of pending uplink data in the buffer based on determining to fall back to performing the data transfer via the first connection using the first RAT, and the transmitting may include operations, features, means, or instructions for transmitting a buffer status report indicating the decreased measured amount of pending uplink data in the buffer.

Some examples of the method, apparatuses, and non-transitory computer-readable medium described herein may further include operations, features, means, or instructions for refraining from transmitting a scheduling request (SR) to the network for the pending uplink data in the buffer based on determining to fall back to performing the data transfer via the first connection using the first RAT.

Some examples of the method, apparatuses, and non-transitory computer-readable medium described herein may further include operations, features, means, or instructions for receiving, from the network, a release message for the second connection using the second RAT based on the measurement report indicating the modified measured value.

Some examples of the method, apparatuses, and non-transitory computer-readable medium described herein may further include operations, features, means, or instructions for triggering radio link failure (RLF) for the second connection using the second RAT based on determining to fall back to performing the data transfer via the first connection using the first RAT and transmitting, to the network, a failure message indicating a failure of the second connection using the second RAT based on the triggered RLF.

A method for wireless communications at a UE is described. The method may include establishing, with a network, a first connection with a first cell using a first RAT and a second connection with a second cell using a second RAT different from the first RAT, performing data transfer via the second connection using the second RAT, determining to fall back to perform the data transfer via the first connection using the first RAT based on data traffic information for the UE, identifying information for transmission to the network, modifying the information based on determining to fall back to performing the data transfer via the first connection using the first RAT, and transmitting, to the network, a message including the modified information.

An apparatus for wireless communications at a UE is described. The apparatus may include a processor, memory coupled with the processor, and instructions stored in the memory. The instructions may be executable by the processor to cause the apparatus to establish, with a network, a first connection with a first cell using a first RAT and a second connection with a second cell using a second RAT different from the first RAT, perform data transfer via the second connection using the second RAT, determine to fall back to perform the data transfer via the first connection using the first RAT based on data traffic information for the UE, identify information for transmission to the network, modify the information based on determining to fall back to performing the data transfer via the first connection using the first RAT, and transmit, to the network, a message including the modified information.

Another apparatus for wireless communications at a UE is described. The apparatus may include means for establishing, with a network, a first connection with a first cell using a first RAT and a second connection with a second cell using a second RAT different from the first RAT, performing data transfer via the second connection using the second RAT, determining to fall back to perform the data transfer via the first connection using the first RAT based on data traffic information for the UE, identifying information for transmission to the network, modifying the information based on determining to fall back to performing the data transfer via the first connection using the first RAT, and transmitting, to the network, a message including the modified information.

A non-transitory computer-readable medium storing code for wireless communications at a UE is described. The code may include instructions executable by a processor to establish, with a network, a first connection with a first cell using a first RAT and a second connection with a second cell using a second RAT different from the first RAT, perform data transfer via the second connection using the second RAT, determine to fall back to perform the data transfer via the first connection using the first RAT based on data traffic information for the UE, identify information for transmission to the network, modify the information based on determining to fall back to performing the data transfer via the first connection using the first RAT, and transmit, to the network, a message including the modified information.

Some examples of the method, apparatuses, and non-transitory computer-readable medium described herein may further include operations, features, means, or instructions for receiving, from the network, a downlink data message and successfully decoding the downlink data message, where the identifying the information for transmission may include operations, features, means, or instructions for identifying a feedback message indicating positive acknowledgment for the downlink data message based on successfully decoding the downlink data message, the modifying may include operations, features, means, or instructions for modifying the feedback message to indicate negative acknowledgment for the downlink data message based on determining to fall back to performing the data transfer via the first connection using the first RAT, and the transmitting may include operations, features, means, or instructions for transmitting the modified feedback message indicating negative acknowledgment for the downlink data message.

In some examples of the method, apparatuses, and non-transitory computer-readable medium described herein, the identifying the information for transmission may include operations, features, means, or instructions for determining to transmit corrupted uplink data based on determining to fall back to performing the data transfer via the first connection using the first RAT, the modifying may include operations, features, means, or instructions for generating a corrupted uplink data message based on determining to transmit the corrupted uplink data, and the transmitting may include operations, features, means, or instructions for transmitting the corrupted uplink data message.

In some examples of the method, apparatuses, and non-transitory computer-readable medium described herein, the corrupted uplink data message includes an information portion and a cyclic redundancy check (CRC) portion, the CRC portion failing to correspond to the information portion according to a checking function.

Some examples of the method, apparatuses, and non-transitory computer-readable medium described herein may further include operations, features, means, or instructions for receiving, from the network, a release message for the second connection using the second RAT based on the message including the modified information.

Some examples of the method, apparatuses, and non-transitory computer-readable medium described herein may further include operations, features, means, or instructions for triggering RLF for the second connection using the second RAT based on determining to fall back to performing the data transfer via the first connection using the first RAT and transmitting, to the network, a failure message indicating a failure of the second connection using the second RAT based on the triggered RLF.

A method for wireless communications at a UE is described. The method may include establishing, with a network, a first connection with a first cell using a first RAT, determining to perform data transfer via the first connection using the first RAT instead of via a second connection using a second RAT different from the first RAT based on data traffic information for the UE, transmitting, to the network, a message indicating a preferred mode of operation for the UE involving performing the data transfer via the first connection using the first RAT based on the determining, and performing the data transfer via the first connection using the first RAT based on the message indicating the preferred mode of operation for the UE.

An apparatus for wireless communications at a UE is described. The apparatus may include a processor, memory coupled with the processor, and instructions stored in the memory. The instructions may be executable by the processor to cause the apparatus to establish, with a network, a first connection with a first cell using a first RAT, determine to perform data transfer via the first connection using the first RAT instead of via a second connection using a second RAT different from the first RAT based on data traffic information for the UE, transmit, to the network, a message indicating a preferred mode of operation for the UE involving performing the data transfer via the first connection using the first RAT based on the determining, and perform the data transfer via the first connection using the first RAT based on the message indicating the preferred mode of operation for the UE.

Another apparatus for wireless communications at a UE is described. The apparatus may include means for establishing, with a network, a first connection with a first cell using a first RAT, determining to perform data transfer via the first connection using the first RAT instead of via a second connection using a second RAT different from the first RAT based on data traffic information for the UE, transmitting, to the network, a message indicating a preferred mode of operation for the UE involving performing the data transfer via the first connection using the first RAT based on the determining, and performing the data transfer via the first connection using the first RAT based on the message indicating the preferred mode of operation for the UE.

A non-transitory computer-readable medium storing code for wireless communications at a UE is described. The code may include instructions executable by a processor to establish, with a network, a first connection with a first cell using a first RAT, determine to perform data transfer via the first connection using the first RAT instead of via a second connection using a second RAT different from the first RAT based on data traffic information for the UE, transmit, to the network, a message indicating a preferred mode of operation for the UE involving performing the data transfer via the first connection using the first RAT based on the determining, and perform the data transfer via the first connection using the first RAT based on the message indicating the preferred mode of operation for the UE.

In some examples of the method, apparatuses, and non-transitory computer-readable medium described herein, the message may include an RRC message and the method, apparatuses, and non-transitory computer-readable medium described herein may further include operations, features, means, or instructions for generating the RRC message including one or more information elements (IEs) indicating the preferred mode of operation for the UE, a current power level of the UE, a power consumption rate of the UE, or a combination thereof.

Some examples of the method, apparatuses, and non-transitory computer-readable medium described herein may further include operations, features, means, or instructions for receiving, from the network, a downlink message querying the UE for the RRC message, where the RRC message may be transmitted based on the downlink message.

In some examples of the method, apparatuses, and non-transitory computer-readable medium described herein, the message may include an uplink control message and the method, apparatuses, and non-transitory computer-readable medium described herein may further include operations, features, means, or instructions for generating a payload for the uplink control message including the preferred mode of operation for the UE.

Some examples of the method, apparatuses, and non-transitory computer-readable medium described herein may further include operations, features, means, or instructions for receiving, from the network, a medium access control (MAC) control element (CE), a DCI message, or a combination thereof querying the UE for the uplink control message, where the uplink control message may be transmitted based on the MAC CE, the DCI message, or a combination thereof.

DETAILED DESCRIPTION

Figure 1:
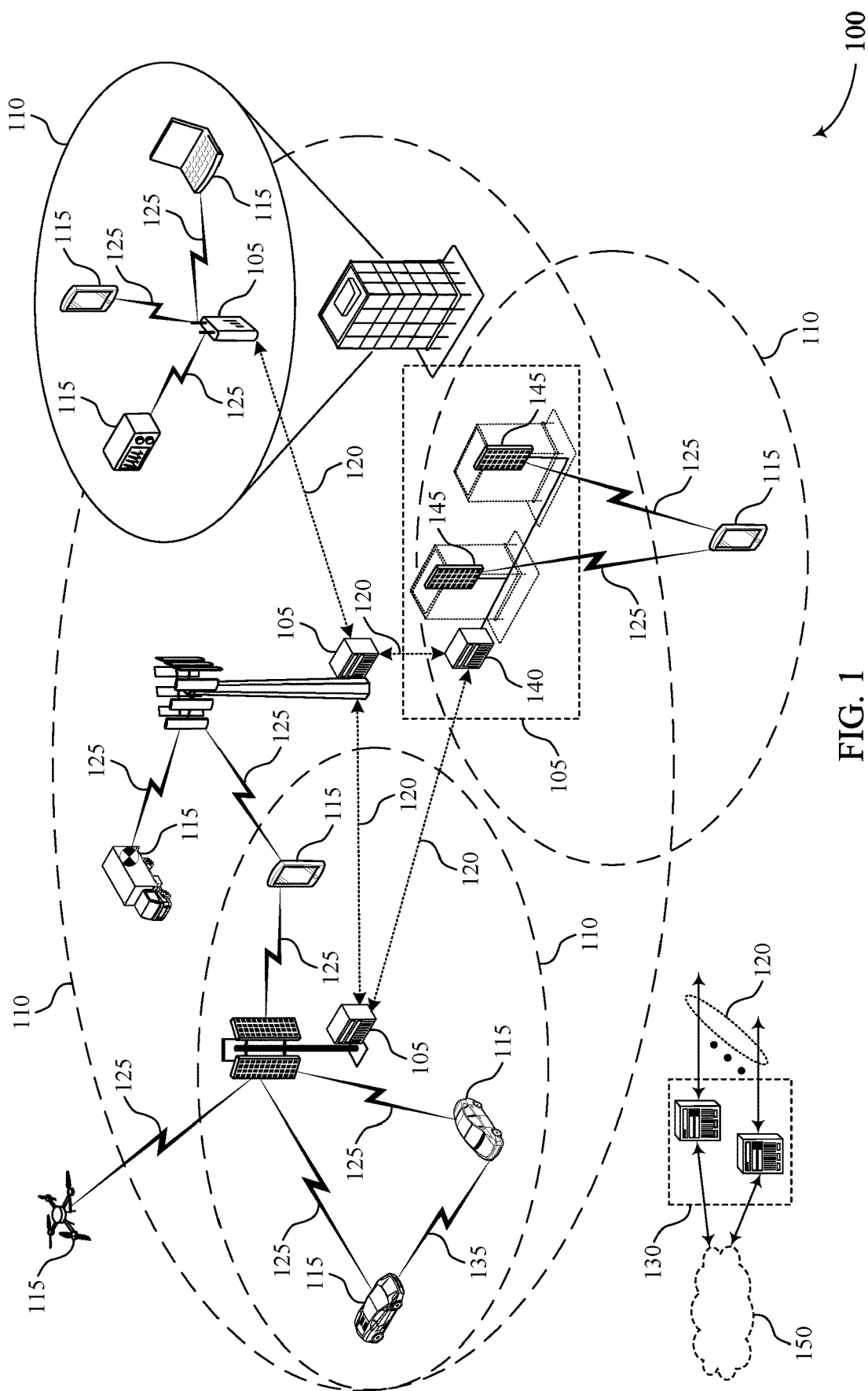
FIGS. 1 and 2 illustrate examples of wireless communications systems that support techniques for triggering radio access technology (RAT) fall back at a user equipment (UE) based on data traffic information in accordance with various aspects of the present disclosure.

Some wireless communications systems may support dual connectivity (DC) between different radio access technologies (RATs), such as Long Term Evolution (LTE) and New Radio (NR). For example, when operating in a non-standalone (NSA) mode, a user equipment (UE) may communicate with a network via both an LTE connection (e.g., for control signaling) and an NR connection (e.g., for data signaling). However, in some cases, maintaining both an LTE connection and an NR connection concurrently may be inefficient for a UE. For example, keeping both LTE and NR protocol stacks active at the UE may use a significant power overhead without significantly improving performance, especially if the data transfer rate for the UE is relatively low. For example, if the data transfer rate—or a predicted data transfer rate—for the UE is below a specific threshold value, an LTE data connection may be sufficient for supporting the data transfer rate while supporting power savings at the UE (as compared to communicating data via an NR connection in an NSA mode).

To reduce processing overhead at the UE, the UE may fall back to using an LTE connection for data signaling. In some examples, the network may request for the UE to add an NR connection for data communications based on the UE establishing an LTE connection with the network. Based on the data rate—or predicted data rate—for the UE falling below a data rate threshold, the UE may delay or abort adding the NR connection for at least a time duration to support power savings. In some examples, the UE may be connected to the network with both an LTE connection and an NR connection. In some such examples, if the UE determines to fall back to LTE operations (e.g., based on the data traffic information for the UE), the UE may transmit a fake report or a fake uplink message (e.g., indicating poor NR connection quality) to trigger the network to drop the NR connection. Additionally or alternatively, the UE may transmit, to the network, a message including a preferred mode of operation for the UE indicating a preference for communicating data via an LTE connection (e.g., as opposed to via an NR connection in an NSA mode). In some such examples, the network may refrain from requesting establishment of an NR connection based on the UE's preferred mode of operation. Any combination of these processes may allow the UE to trigger RAT fall back to LTE for data communications based on data traffic information, supporting power savings at the UE.

The UE may determine data traffic information based on radio link control (RLC) data throughput metrics, packet data convergence protocol (PDCP) data throughput metrics, application layer data throughput metrics, or some combination thereof for the UE. In some examples, the UE may calculate a predicted data transfer rate based on historic values for a specific time period and may determine whether to use an LTE connection or an NR connection in order to support the predicted data transfer rate. For example, the UE may use application layer information to determine whether to fall back to LTE for data communications based on one or more applications running at the UE. Additionally or alternatively, the UE may implement a machine learning process to enhance the data transfer rate prediction.

Aspects of the disclosure are initially described in the context of wireless communications systems. Aspects of the disclosure are further illustrated by and described with reference to process flows, apparatus diagrams, system diagrams, and flowcharts that relate to techniques for triggering RAT fall back at a UE based on data traffic information.

FIG. 1 illustrates an example of a wireless communications system 100 that supports techniques for triggering RAT fall back at a UE based on data traffic information in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), an unlicensed radio frequency spectrum band for LTE communications, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at specific orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a specific orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, the wireless communications system 100 may support DC between different RATs, such as LTE and NR. Additionally or alternatively, the wireless communications system 100 may support other RATs in any combination. When operating in a DC mode (e.g., an NSA mode), a UE 115 may communicate with the network (e.g., via one or more base station 105) using an LTE connection for control signaling and an NR connection for data signaling. In some cases, maintaining both an LTE connection and an NR connection concurrently may be inefficient for a UE 115. For example, keeping both LTE and NR stacks active at the UE 115 may use a significant processing overhead without significantly improving performance, especially if the data transfer rate for the UE 115 is relatively low (e.g., below a semi-static or dynamic threshold value). To improve power savings, in some examples, the UE 115 may support falling back to an LTE connection for control and data signaling. For example, the UE 115 may refrain from adding an NR connection or may trigger release of an existing NR connection to fall back to LTE based on data traffic information.

Figure 2:
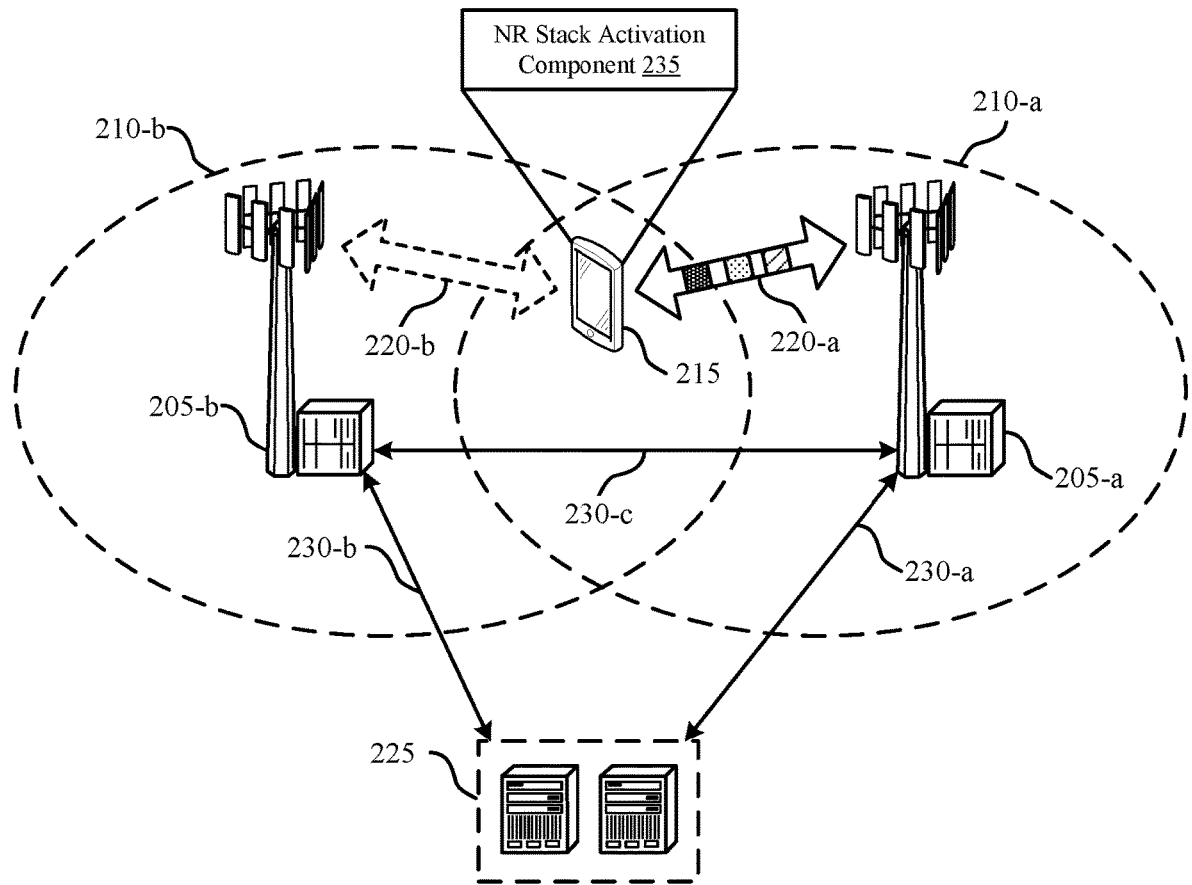

FIG. 2 illustrates an example of a wireless communications system 200 that supports techniques for triggering RAT fall back at a UE based on data traffic information in accordance with various aspects of the present disclosure. For example, a UE 215, such as a UE 115 described with reference to FIG. 1, may fallback to an LTE connection from an NR connection based on a data transfer rate associated with a data traffic pattern. In some examples, the wireless communications system 200 may implement aspects of a wireless communications system 100. For example, the wireless communications system 200 may include base station 205*a*, base station 205-*b*, and a UE 215, which may be examples of base stations 105 and a UE 115 as described with reference to FIG. 1. Base station 205-*a* may serve coverage area 210-*a* and base station 205-*b* may serve coverage area 210-*b*.

In some examples, base station 205-*a* may support a first RAT (e.g., LTE) and base station 205-*b* may support a second RAT (e.g., NR). In some other examples, a base station 205 may support both a first RAT and second RAT (e.g., LTE and NR). In some examples, a UE 215 may be capable of DC operation. That is, the UE 215 may establish connection 220-*a* with base station 205-*a* and communicate with the network using an LTE protocol stack. Additionally or alternatively, the UE 215 may establish connection 220-*b* with base station 205-*b* and communicate with the network using an NR protocol stack.

In some examples, the wireless communications system 200 may support an NSA mode of communications. In the NSA mode, both base stations 205 may be supported by a shared core network 225 (e.g., an EPC or a 5G NSA core). That is, a 5G network may be supported by 4G infrastructure (e.g., eNBs, an EPC, or some combination thereof). The base stations 205 may communicate with the core network 225, each other, or both via backhaul links 230. The backhaul links 230 may be examples of wired backhaul links, wireless backhaul links, or some combination thereof. For example, base station 205-*a* may communicate with the core network 225 via backhaul link 230*a*, base station 205-*b* may communicate with the core network 225 via backhaul link 230-*b*, and base station 205-*a* may communicate with base station 205-*b* either indirectly through the core network 225 or directly via backhaul link 230-*c*. In some examples, when operating in an NSA mode of operation, the UE 215 may communicate with the LTE cell (e.g., via a connection 220*a*) for control plane signaling and may communicate with the 5G cell (e.g., via a connection 220-*b*) to transmit and receive user plane data.

In some examples, the wireless communications system 200 may utilize measurement reports to routinely assess connection 220-*b* (e.g., an NR connection) while the UE 215 is operating in the NSA mode. For example, the UE 215 may periodically (or aperiodically) receive NR reference signals when the NR stack and LTE stack are active (e.g., the UE is operating in the NSA mode). In some examples, the measurement reports may be radio resource control (RRC) layer measurement reports or physical layer measurement reports. RRC layer measurement reports may be transmitted to the network once the NR signal strength and quality values satisfy an entering condition associated with an event (e.g., an A1, A2, A3, A4, A5, A6, B1, or B2 event). In some examples, the network may make decisions based on the measurement reports. For examples, the measurement report may indicate poor NR signal strength (e.g., below a threshold) to the network, and the network may determine to release the UE 215 from an NR connection.

While operating in the NSA mode, the UE 215 may transmit information to the network pertaining to pending uplink data via an NR connection. For example, the UE 215 may transmit a buffer status report. The buffer status report may indicate the amount of uplink data in the buffer. For example, if the buffer status report indicates zero, there is no uplink data pending at the UE's buffer. Additionally or alternatively, the UE 215 may transmit a scheduling request (SR). The SR may indicate to the network that the UE 215 requests granted resources for transmitting uplink data. In some examples, if the UE 215 transmits a buffer status report indicating zero pending uplink data, if the UE 215 does not transmit an SR to the network, or if both occur, the network may determine to release the UE 215 from a data connection 220-*b* (e.g., an NR connection).

In some examples, the wireless communications system 200 may utilize feedback mechanisms. For example, the UE 215 may transmit feedback to indicate to a base station 205 whether a downlink transmission was received and decoded successfully by the UE 215. If a downlink message is received and decoded successfully, the UE 215 may transmit a positive acknowledgment (ACK) feedback indication to the network. If a downlink message is not received or decoded successfully, the UE 215 may transmit a negative acknowledgment (NACK) feedback indication to the network. In some cases, NACK feedback may trigger a retransmission from a base stations 205. In some examples, repeated NACK feedback may indicate to the network that the connection is problematic, and the network may release the connection associated with the failed downlink transmissions (e.g., connection 220-*b*).

In some systems, a UE 215 operating in an NSA mode may communicate data to the network via connection 220-*b* (e.g., NR connection) in situations of relatively low data transfer. For example, the UE 215 may establish connection 220-*a* and communicate with the network using the LTE stack. Additionally, the UE 215 may establish connection 220-*b* and communicate with the network using the NR stack. In some examples, actively communicating using the NR stack and the LTE stack may cause higher power consumption at the UE 215 than communicating both data and control information using the LTE stack. For example, communicating using the NR stack may involve additional radio frequency components, such as phasors, disruptors, antenna patches, or a combination thereof, which are relatively power intensive.

In some cases, the UE 215 may transmit and receive data at a high rate (e.g., greater than or equal to a threshold data rate). If high data transfer occurs at the UE 215, communications over the NR stack may be more efficient, because an NR connection may offer higher throughput and lower latency than an LTE connection. That is, the efficiency gains of using the NR stack may warrant extra power consumption at the UE 215. However, in some other cases, the UE 215 may transmit and receive data at a low rate (e.g., below the threshold data rate). If the data transfer is relatively low at the UE 215, the higher throughput supported by the NR stack may not be utilized and, accordingly, the extra power consumption at the UE 215 to support communications over the NR stack may not be warranted. The network may rely on parameters such as pending data in a buffer, a number of user devices, estimation models, connection quality, or some combination thereof to determine whether to release connection 220-*b*. Until the network releases connection 220-*b*, the UE 215 may continue to communicate using the NR stack and, thus, may continue to consume excess power.

In some examples, the UE 215 may estimate a data traffic pattern. For example, the UE 215 may estimate a data traffic pattern by analyzing throughput numbers of prior communications. The UE 215 may analyze RLC throughput numbers, PDCP data throughput numbers, or a combination thereof stored in memory of the UE 215 for a recent time period. In some examples, the throughput numbers may be obtained from LTE communications prior to adding the NR stack or from LTE and NR communications after adding the NR stack. In some examples, the UE 215 may classify the data transfer rate associated with the data traffic pattern as a high data transfer (e.g., if the data transfer rate is above a threshold) or a low data transfer (e.g., if the data transfer rate is below a threshold). The classification may be made in real time or pseudo-real time using information from previous time instances (e.g., an X millisecond (ms) sliding window preceding a current timestamp). In some cases, the UE 215 may determine which stack (e.g., the NR or LTE stack) to use for communications based on the data traffic pattern.

In some examples, the UE 215 may delay or abort the addition of the NR stack based on the data traffic pattern. For example, the UE 215 may establish connection 220-*a* and communicate with the network over the LTE stack. Additionally, the UE 215 may be capable of DC operation and may indicate the DC capability of the UE 215 to the network (e.g., via connection 220-*a* to base station 205*a*). The network may initiate a process to establish connection 220-*b* based on the UE 215 supporting DC operation. For example, base station 205-*a* may transmit an RRC reconfiguration message to the UE 215 requesting that the UE 215 add a secondary cell group (SCG). The SCG may include base station 205-*b* supporting NR operations.

In some cases, the UE 215 may estimate the data traffic pattern. If the data traffic pattern is considered high data transfer (e.g., equal to or above a pre-configured, semi-static, or dynamic threshold), the UE 215 may activate the NR stack and add the requested SCG to support data communications via an NR connection (e.g., connection 220-*b*). Alternatively, if the data transfer associated with the data traffic pattern is low (e.g., below the pre-configured, semi-static, or dynamic threshold), the UE 215 may utilize an NR stack activation component 235. In some examples, the NR stack activation component 235 may delay one or more steps involved in establishing connection 220-*b* (e.g., an NR connection). For example, the NR stack activation component 235 may delay cell search and acquisition at the UE 215. In some examples, the NR stack activation component 235 may include a timer (e.g., based on a T304 timer or another timer). While the timer is active, the UE 215 may communicate with the network over the LTE stack via connection 220*a*. In some examples, if the traffic changes from low traffic to high traffic during the duration of the timer, the UE 215 may establish connection 220-*b* according to a cell addition procedure before expiry of the timer. Alternatively, if the traffic does not change and the timer expires, the network may consider the addition of NR connection 220-*b* a failure and attempt re-establishment. In other examples, upon expiration of the timer, the UE 215 may establish connection 220-*b* (e.g., the NR connection) according to a cell addition procedure (e.g., prior to expiry of another timer, such as a T304 timer). The UE 215 may activate the timer based on receiving the SCG addition request from the network, causing the UE 215 to delay establishing the NR connection until the timer expires or until the data traffic changes from low to high data transfer. Additionally or alternatively, the NR stack activation component 235 may abort the addition of the NR stack completely. That is, the NR stack activation component 235 may trigger a failure message (e.g., an SCG failure message) to be sent to the network in response to the SCG addition request message due to the data traffic pattern for the UE 215. Based on the failure message, the network may abort the addition of the NR stack and the UE 215 may continue to communicate data with the network using the LTE stack.

In some examples, the UE 215—for example, operating in an NSA mode—may transmit a fake report 240 based on the estimated data traffic pattern. In some examples, the UE 215 may actively communicate with the network via the LTE stack (e.g., using connection 220*a*) and the NR stack (e.g., using connection 220-*b*). In some examples, the UE 215 may estimate the data traffic pattern and associated data transfer rate (e.g., either high data transfer rate or low data transfer rate). As described herein, the UE 215 may receive periodic or aperiodic NR reference signals and may transmit measurement reports while operating in the NSA mode based on one or more signal strength and/or quality measurements associated with the NR connection (e.g., connection 220-*b*). If the UE 215 determines the data transfer rate associated with the data traffic pattern is low (e.g., below a threshold), the UE 215 may manipulate the measurement report to indicate poor NR signal strength and/or quality (e.g. below a threshold). Such poor signal strength and or quality for a connection 220-*b* may trigger the network to release the connection 220-*b*, allowing the UE 215 to fall back to a different connection 220-*a* (e.g., an LTE connection). In some cases, the UE 215 may repeatedly transmit fake measurement reports to the network. In some examples, the UE 215 may transmit a fake buffer status report to the network. That is, the UE 215 may manipulate the information within the buffer status report to indicate no pending uplink data in the UE's buffer (e.g., indicating a value of zero), even if the UE's buffer includes pending uplink data. Additionally or alternatively, the UE 215 may refrain from transmitting an SR requesting uplink resources from the network. Based on one or more fake reports 240 received from the UE 215, the network may release the NR connection (e.g., by transmitting a release message, such as an SCG release message) for the UE 215. If the network does not initiate a release for the NR connection after a predetermined period, the UE 215 may reactively trigger radio link failure (RLF) and transmit a failure message to the network. In response, the network may breakdown connection 220-*b* and the UE 215 may revert to communicating with the network via connection 220-*a* (e.g., an LTE connection).

In some examples, the UE 215—for example, operating in an NSA mode—may transmit fake NACK feedback 245 or other fake uplink information based on the estimated data traffic pattern. In some example, the UE 215 may actively communicate with the network via the LTE stack (e.g., using connection 220*a*) and the NR stack (e.g., using connection 220-*b*) when in the NSA mode. In some examples, the UE 215 may estimate the data traffic pattern and associated data transfer rate (e.g., either high data transfer or low data transfer). As described herein, the network may receive feedback from the UE 215 indicating if a downlink transmission has been received and decoded successfully by the UE 215. If the UE 215 determines that the data transfer associated with the data traffic is low (e.g., below a threshold), the UE 215 may transmit fake NACK feedback to the network for a downlink transmission received over the NR connection. That is, even if the downlink transmission received over the NR connection is decoded successfully without error (e.g., a CRC or other error check procedure passes for the downlink message), the UE 215 may transmit feedback indicating that the downlink transmission was not decoded successfully (e.g., NACK feedback). Repeated NACK feedback over a connection 220 may indicate to the network that the connection 220 is unreliable and, accordingly, should be taken down. Additionally or alternatively, the UE 215 may transmit corrupted uplink data via the NR connection. For example, the UE 215 may intentionally transmit an uplink message to the network with error check bits that do not correctly correspond to the information in the message, causing a failed error check procedure (e.g., CRC procedure) even if the message is received correctly. Failing to decode an uplink message (e.g., based on the message being intentionally corrupted) received over a connection 220 may similarly indicate to the network that the connection 220 is unreliable. In response to one or more fake NACK feedback messages, one or more corrupted uplink data messages, or both, the network may transmit a release message (e.g., an SCG release) to the UE 215 to release the NR connection. If the network does not initiate a release for the NR connection after a predetermined period, the UE 215 may trigger RLF and transmit a failure message to the network. In response, the network may breakdown connection 220-*b* (e.g., the NR connection) and the UE 215 may fall back to communicate with the network via connection 220-*a* (e.g., the LTE connection).

In some examples, the UE 215 may indicate a preference to communicate over the NR stack or the LTE stack based on the estimated data traffic pattern. In some examples, the UE 215 may initially establish connection 220-*a* and communicate with the network over the LTE stack. The UE 215 may estimate a data traffic pattern and the data traffic rate associated with the data traffic pattern. In some examples, the UE 215 may transmit a preference indication 250 to the network (e.g., in UE capability signaling or another uplink message). The preference indication 250 may indicate a preference for communication over the NR stack or the LTE stack. In some examples, the preference indication 250 may be signaled to the network via RRC or MAC signaling. In cases of low data transfer, the UE 215 may transmit the preference indication 250 indicating a preference for communication over the LTE stack. In response, the network may refrain from adding the NR stack based on the UE's indicated preference. Alternatively, if the UE 215 has previously established an NR connection (e.g., the UE 215 is operating in NSA mode) and determines the data transfer rate is low, the UE 215 may transmit the preference indication 250 indicating a preference for communication over the LTE stack, and the network may release the NR stack based on the UE's preference. The UE 215 may dynamically switch between indicating a preference for the LTE stack and not indicating a preference for the LTE stack (e.g., indicating a preference for the NR stack or indicating no preference) based on the UE's data traffic information. For example, if the UE's data transfer rate increases (e.g., above a threshold), the UE may indicate a different preference indication 250 to the network such that the network may determine to establish an NR connection with the UE 215.

Additionally or alternatively, the UE 215 may estimate data traffic patterns by analyzing information within the application layer. The application layer may initiate and/or terminate data transfer and may include information related to traffic characteristics (e.g., data transfer, traffic rate, total data transfer, etc.) for each application at the UE 215. With this information, the UE 215 may create a profile of the most commonly used applications and may use the profile to determine which stack (e.g., NR or LTE) to use for data transfer. In some examples, the UE 215 may select a stack for data transfer based on which applications are currently running at the UE 215. In some examples, the application processor may indicate an NR stack tear down based on the context of data patterns for the active applications running at the UE 215. In some examples, the UE 215 may utilize machine learning to enhance the analysis. For example, through machine learning, the profile for determining whether to fall back to LTE may include application usage information pertaining to time-of-day, day-of-week, UE location (e.g., using global positioning system (GPS) or other positioning information), or any other available application information.

By using any combination of these techniques, the UE 215 may fall back from an NR connection (e.g., connection 220-*b*) for data communications to an LTE connection (e.g., connection 220*a*) for data communications. While the UE's data transfer rate is relatively low (e.g., below a preconfigured, semi-static, or dynamic threshold), the LTE connection may support the UE's data traffic. By removing the NR connection and deactivating the NR stack, the UE 215 may significantly reduce processing overhead associated with data communications. Furthermore, by dynamically determining to fall back to LTE based on data traffic information for the UE 215, the UE 215 may determine to reestablish an NR connection if the data transfer rate increases (e.g., above the threshold), such that an NR connection may significantly improve the UE's performance. In some examples, the UE 215 may refrain from falling back to LTE if data communications for the UE 215 are associated with a strict latency threshold (e.g., a latency threshold supported by NR but not LTE).

Figure 3:
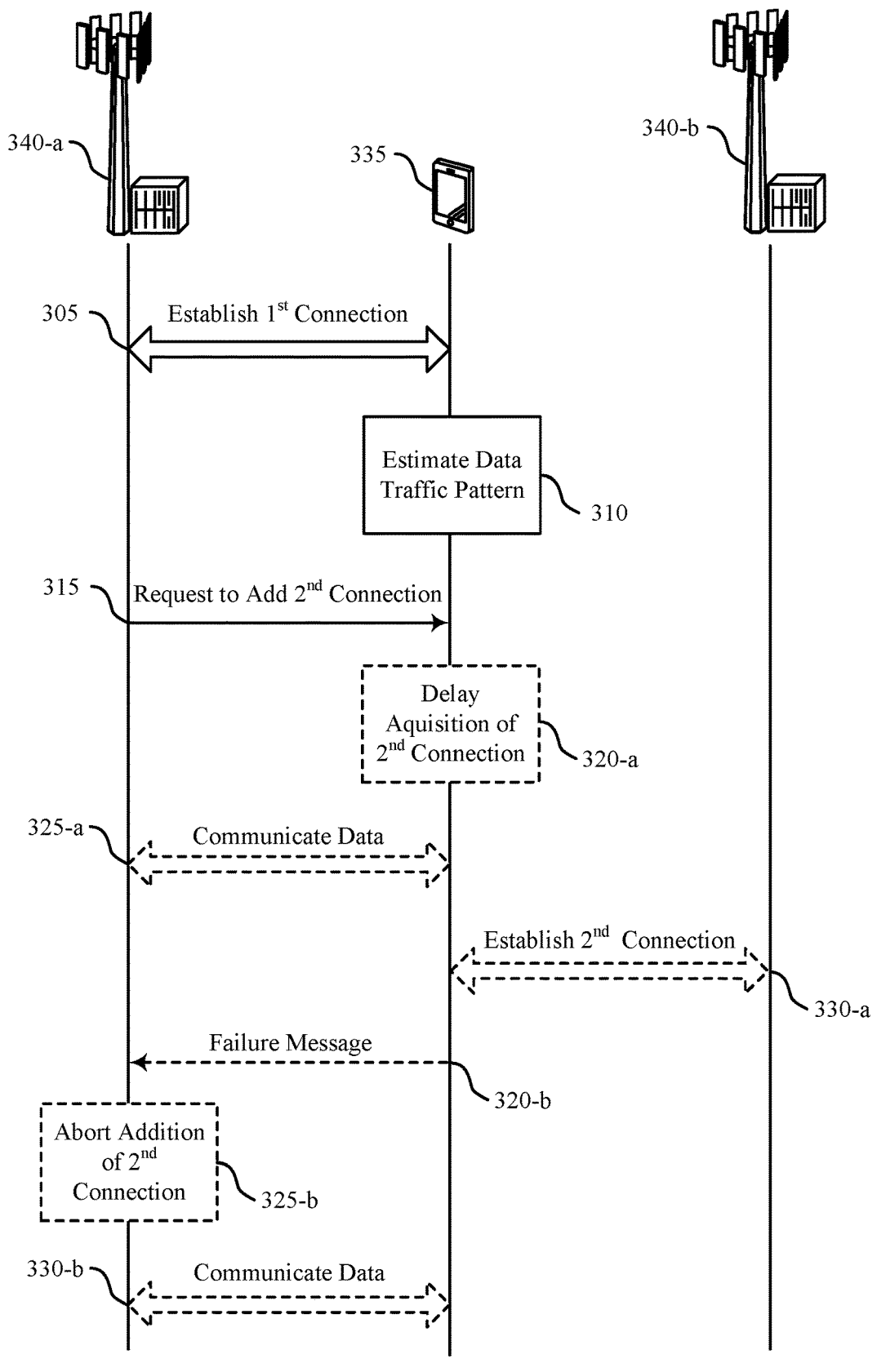
FIGS. 3 through 6 illustrate examples of process flows that support techniques for triggering RAT fall back at a UE based on data traffic information in accordance with various aspects of the present disclosure.

FIG. 3 illustrates an example of a process flow 300 that supports techniques for triggering RAT fall back at a UE based on data traffic information in accordance with various aspects of the present disclosure. In some examples, the process flow 300 may implement aspects of wireless communications systems 100 or 200 as described with reference to FIGS. 1 and 2. The process flow 300 may involve a UE 335 operating in DC mode with base station 340-*a* which may support LTE and base station 340-*b* which may support NR. In some examples, the UE 335 may estimate a data traffic pattern and delay or abort the addition of an NR stack (e.g., supporting an NR connection) based on the estimated traffic pattern. Alternative examples of the following may be implemented, where some steps are performed in a different order then described or are not performed at all. In some cases, a step may include additional features not mentioned below, or further steps may be added.

At 305, the UE 335 may establish a first connection associated with a first RAT. For example, the UE 335 may establish an LTE connection with base station 340-*a* and communicate with the network using the LTE stack. In some examples, the UE 335 may be capable of DC and may indicate DC support to the network via base station 340-*a*.

At 310, the UE 335 may estimate a data traffic pattern. In some examples, the UE 335 may estimate the data traffic pattern by analyzing throughput numbers of past communications (e.g., stored in memory at the UE 335). The UE 335 may extract data throughput numbers from RLC and/or PDCP layers. In some examples, the UE 335 may classify the data traffic pattern as "high" data transfer or "low" data transfer, where classification may be based on one or more thresholds. That is, if the data transfer rate associated with the data traffic pattern is greater than or equal to a threshold value, the data traffic pattern may be classified as high data transfer. Alternatively, if the data transfer rate associated with the data traffic pattern is less than the threshold value, the data traffic pattern may be classified as low data transfer. Additionally or alternatively, the UE 335 may estimate the data traffic pattern by analyzing the application layer. An application processor at the UE 335 may initiate and/or terminate data transfer, for example, using traffic characteristics such as data transfer, traffic rate, total data transfer, or any other traffic characteristics for one or more applications. The UE 335 may use this information to create a profile of the most commonly used applications, where the profile may support the UE 335 determining whether to fall back to LTE operation or operate in a DC mode for LTE and NR. In some examples, machine learning may be used to better predict the data traffic pattern extracted from the application layer, better determine whether to fall back to LTE for data communications, or both. For example, machine learning may enhance the profile by including application usage information (e.g., metrics related to specific times-of-day, metrics related to specific times-of-week, metrics related to location information, etc.) which may allow the UE 335 to more accurately judge the power vs. performance payoff of adding or tearing down the NR stack.

Based on the data traffic pattern, the UE 335 may delay or abort an addition of an NR stack. For example, if a modem at the UE 335 (e.g., an LTE modem) determines a current traffic pattern (e.g., based on a prediction or current conditions), the modem may determine whether to activate an NR stack if requested or not activate the NR stack (e.g., delay or abort the activation to remain on an LTE connection for data transfer). For example, at 315, the network may transmit a request to add the second connection. In some examples, the second connection may be associated with a second RAT. For example, the network may request an addition of an NR connection using a primary secondary cell (PSCell) addition request message indicating an NR SCG.

At 320*a*, the UE 335 may delay one or more steps involved in the process of establishing the second connection during situations of low data transfer based on the data traffic pattern. For example, the UE 335 may delay steps associated with cell search, cell acquisition, or both. In some examples, the delay may be based on a timer (e.g., a T304 timer). A T304 timer may activate upon reception of an RRC reconfiguration request message or a PScell addition request message from the network and may expire after a specific timer duration (e.g., 20 seconds or some other configured timer duration). During the delay, the UE 335 may communicate data using the first connection at 325*a*. That is, the UE 335 may transmit and/or receive data using the LTE stack. As described with reference to FIG. 2, prior to or upon expiry of the timer, the UE 335 may establish the second connection and transmit and/or receive data using the NR stack at 330-*a*.

Alternatively, at 320-*b*, the UE 335 may transmit a failure message to the network via base station 340-*a* during situations of low data transfer based on the data traffic pattern. In some examples, the failure message may be an example of an SCG failure message. At 325-*b*, the network may receive the failure message from the UE 335 and may abort the process of adding the second connection. The UE 335 may continue communicating data on the first connection at 330-*b*. That is, the UE 335 may transmit and/or receive data using the LTE stack.

Figure 4:
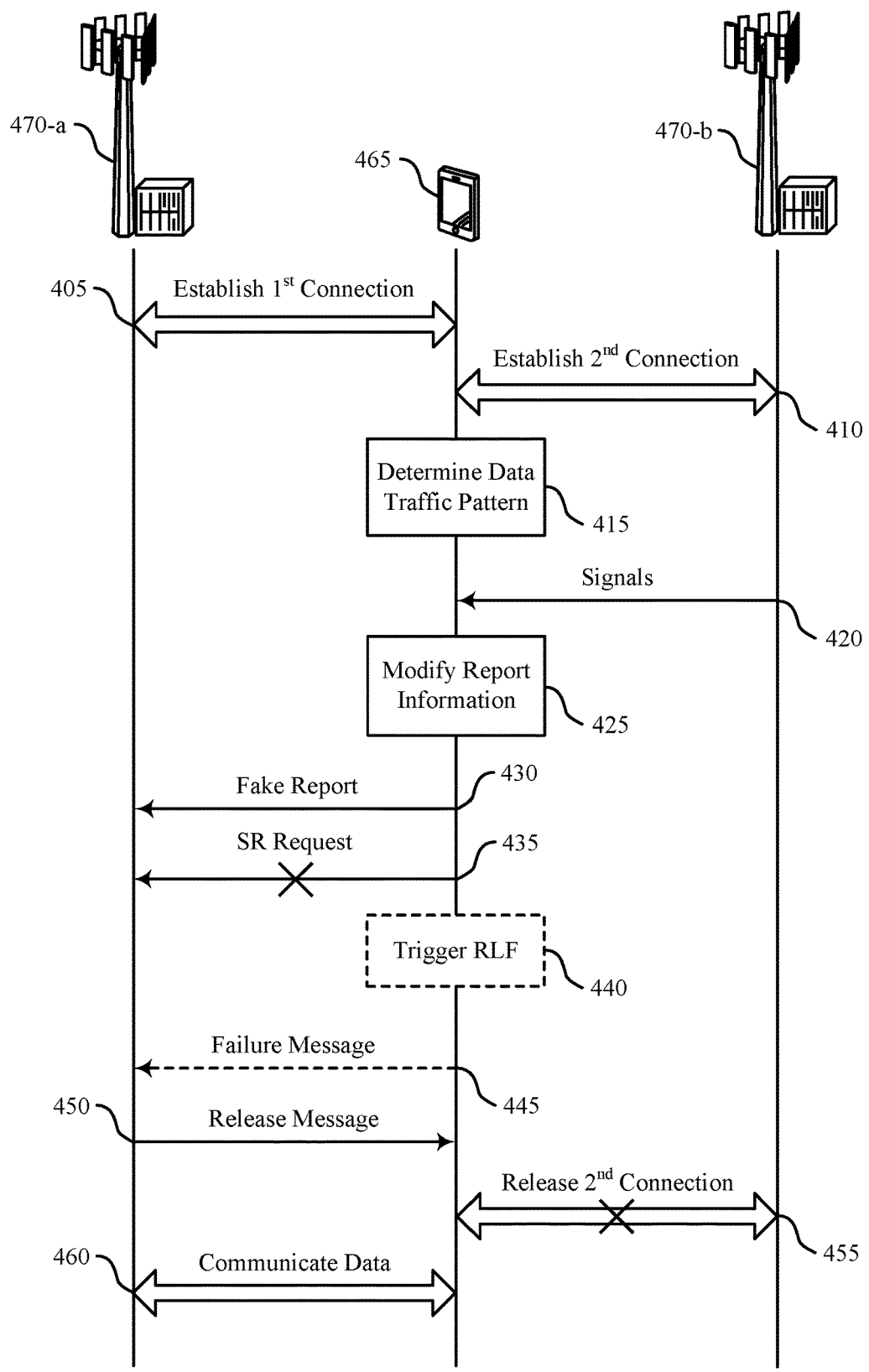

FIG. 4 illustrates an example of a process flow 400 that supports techniques for triggering RAT fall back at a UE based on data traffic information in accordance with various aspects of the present disclosure. In some examples, the process flow 400 may implement aspects of wireless communications system 100, wireless communications system 200, or process flow 300 as described with reference to FIGS. 1 through 3. The process flow 400 may involve a UE 465 operating in DC mode with base station 470-*a* which may support LTE and base station 470-*b* which may support NR. In some examples, the UE 465 may estimate a data traffic pattern and may modify reports based on the estimated traffic pattern. Alternative examples of the following may be implemented, where some steps are performed in a different order then described or are not performed at all. In some cases, a step may include additional features not mentioned below, or further steps may be added.

At 405, the UE 465 may establish a first connection associated with a first RAT. For example, the UE 465 may establish a connection with base station 470-*a* and communicate with the network using the LTE stack. In some examples, the UE 465 may be capable of DC and may indicate the DC capability to the network via base station 470-*a*.

At 410, the UE 465 may establish a second connection associated with a second RAT. For example, the UE 465 may establish a connection with base station 470-*b* and may communicate with the network using the NR stack. That is, the UE 465 may operate in NSA mode.

At 415, the UE 465 may estimate a data traffic pattern. In some examples, the UE 465 may estimate a data traffic pattern by analyzing throughput numbers of past communications. The UE 465 may extract data throughput numbers from RLC and/or PDCP layers. In some examples, the UE 465 may classify the data traffic pattern as "high" data transfer or "low" data transfer based on a threshold. That is, if the data transfer rate associated with the data traffic pattern is above a threshold, the data traffic pattern may be classified as "high" data transfer. Alternatively, if the data transfer rate associated with the data traffic pattern is below a threshold, the data traffic pattern may be classified as "low" data transfer. Based on the data traffic pattern, the UE 465 may modify reports transmitted to the network (e.g., to trigger release of an NR connection).

At 420, base station 470-b may transmit one or more signals associated with the second RAT (e.g., NR reference signals) to the UE 465. In some examples, signals may be transmitted periodically such that the UE 465 may check the signal quality and strength of the second connection. In some examples, the signals may include synchronization signal blocks (SSBs), channel state information reference signals (CSI-RSs), or a combination thereof.

At 425, the UE 465 may modify report information based on the data traffic pattern in situations of low data transfer to create a fake "bad" report (e.g., a report message including intentionally incorrect information to indicate poor NR connection or channel quality). In some examples, the report may be a measurement report. The UE 465 may use one or more signals received at 420 to construct a measurement report indicating values associated with the NR connection signal strength and/or quality. For example, the UE 465 may construct a measurement report which includes values for reference signal received quality (RSRQ), signal-to-noise ratio (SNR), signal-to-interference-plus-noise ratio (SINR), reference signal receive power (RSRP), channel quality indicator (CQI), rank indicator (RI), or any combination of these or other measurement values. In an example, the UE 465 may modify an RSRQ and/or SINR value to trigger connection release, rather than uplink or downlink power modification for ongoing data transfer. In some examples, the measurement report may be transmitted over the RRC Level (e.g., Layer 3) or the physical level (e.g., Layer 1). A physical layer measurement report may be configured in CSI-MeasConfig for SSB and/or CSI-RS reporting. If the data traffic pattern is classified as low data transfer, the UE 465 may modify the values included in the measurement report to indicate poor NR signal power and/or quality (e.g., below a threshold)—even if the NR signal power and/or quality is strong—to create a fake "bad" measurement report. That is, the UE 465 may measure a signal value, subtract a modification value from the measured signal value, and report the modified signal value rather than the actual measured signal value to the network. Additionally or alternatively, in the case of an RRC measurement report, the UE 465 may modify the values to satisfy a trigger condition (e.g., to trigger transmitting a measurement report indicating that an NR connection quality falls below a threshold quality). Alternatively, the report may be a buffer status report. In situations of low data transfer, the UE 465 may modify the buffer status report to indicate that there is no (or negligible) uplink data in the UE's buffer—even if there is uplink data pending in the buffer—to create a fake buffer status report. For example, the buffer status report may indicate zero instead of any number greater than zero. In some examples, the network may release an NR data connection if the UE 465 has no pending uplink data for transmission (e.g., and if the network has no pending downlink data for the UE 465).

At 430, the UE 465 may transmit the fake report to the network. In some cases, the UE 465 may signal the fake report to the network via the connection associated with a first RAT (e.g., LTE connection). Alternatively, the UE 465 may signal the fake report to the network via the connection associated with a second RAT (e.g., NR connection). In some examples, the UE 465 may repeatedly transmit fake reports to the network.

Additionally or alternatively, at 435, the UE 465 may refrain from sending an SR to the network requesting an uplink grant based on the data traffic pattern. An SR message may indicate to the network that the UE 465 is requesting to transmit uplink data. In situations when the data transfer associated with the data traffic pattern is low, the UE 465 may stop sending SRs even when uplink data exists in the buffer (e.g., to potentially trigger release of the NR connection).

In some cases, repeated fake reports may trigger a release of the second connection (e.g., NR connection). For example, the network may receive the repeated fake reports from the UE 465 and may determine to release the NR connection. In such an example, at 450, the network may transmit a release message (e.g., SCG release) to the UE 465, and the UE 465 may release the second connection at 455. At 460, the UE 465 may communicate data via the first connection (e.g., LTE connection).

In some cases, the one or more repeated fake reports may not trigger a release of the second connection at the network. In some such cases, the UE 465 may initiate a release of the second connection. For example, the UE 465 may trigger RLF at 440 and transmit a failure message to the network at 445. In some examples, the UE 465 may trigger RLF after a predetermined time. For example, the UE 465 may trigger RLF based on a counter. The counter may track the number of fake reports that have been sent to the network. If the number of fake reports reaches a threshold, the UE 465 may trigger RLF. In response to the failure message, the network may transmit a release message (e.g., SCG release) to the UE 465 at 450, and the UE 465 may release the second connection at 455. At 460, the UE 465 may communicate data via the first connection (e.g., LTE connection).

Figure 5:
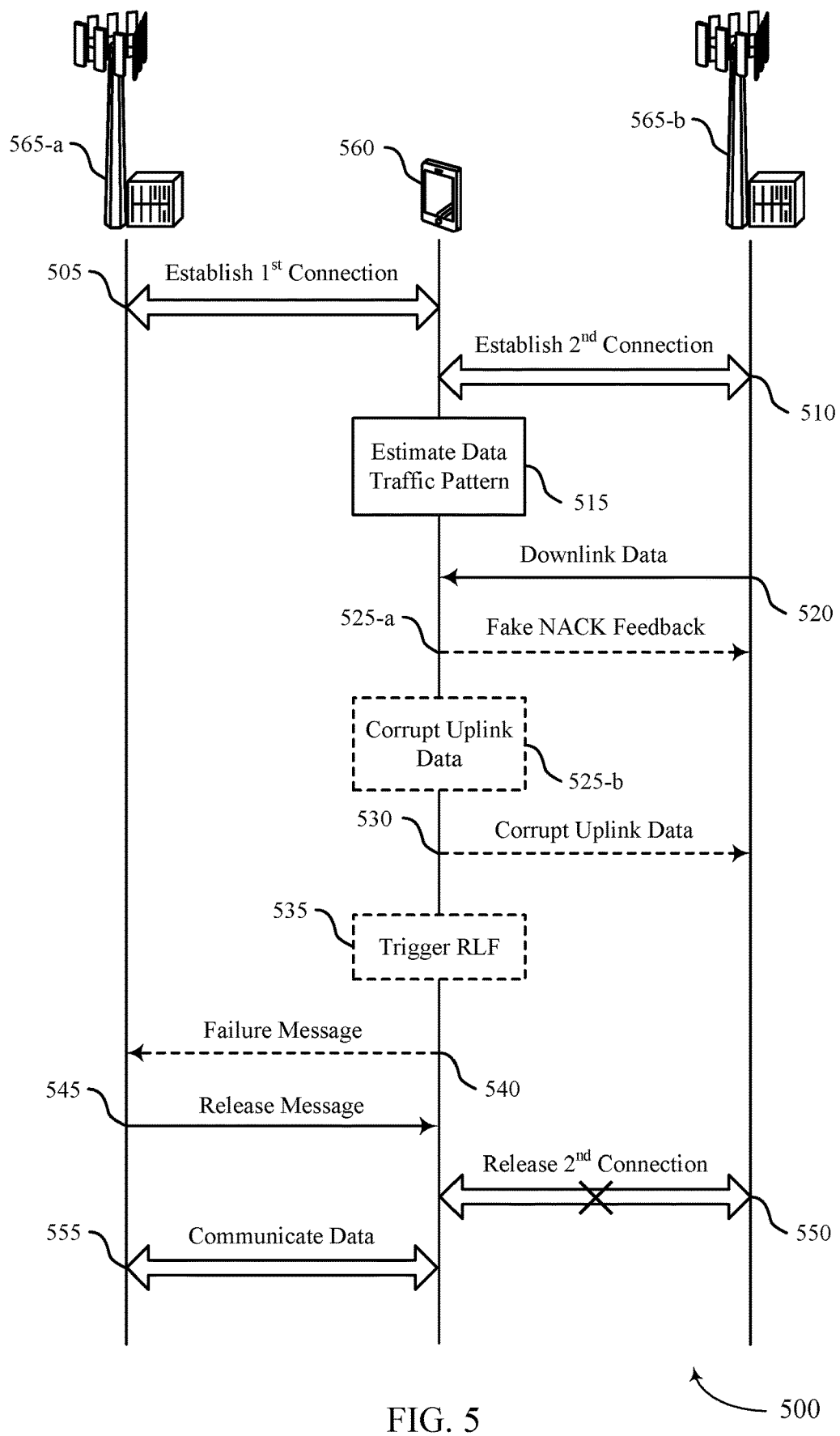

FIG. 5 illustrates an example of a process flow 500 that supports techniques for triggering RAT fall back at a UE based on data traffic information in accordance with various aspects of the present disclosure. In some examples, the process flow 500 may implement aspects of wireless communications system 100, wireless communications system 200, process flow 300, or process flow 400 as described with reference to FIGS. 1 through 4. The process flow 500 may involve a UE 560 operating in DC mode with base station 565-a which may support LTE and base station 565-b which may support NR. In some examples, the UE 560 may estimate a data traffic pattern and may modify uplink messaging (e.g., feedback messages, data messages, or a combination thereof) based on the estimated traffic pattern. Alternative examples of the following may be implemented, where some steps are performed in a different order then described or are not performed at all. In some cases, a step may include additional features not mentioned below, or further steps may be added.

In some examples, the UE 560 may operate in NSA mode. For example, at 505, the UE 560 may establish a connection associated with a first RAT (e.g., LTE) and communicate to the network via base station 565-*a*. Additionally, at 510, the UE 560 may establish a connection associated with a second RAT (e.g., NR) and communicate with the network via base station 565-*b*.

At 515, the UE 560 may estimate a data traffic pattern. In some examples, the UE 560 may estimate a data traffic pattern by analyzing throughput data of past communications (e.g., for a sliding window in time). The UE 560 may extract data throughput numbers from RLC and/or PDCP layers. In some examples, the UE 560 may classify the data traffic pattern as "high" data transfer or "low" data transfer. The classification may be based on a threshold. That is, if the data transfer rate associated with the data traffic pattern is above the threshold, the data traffic pattern may be classified as "high" data transfer. Alternatively, if the data transfer rate associated with the data traffic pattern is below the threshold, the data traffic pattern may be classified as "low" data transfer. Based on the data traffic pattern, the UE 560 may modify an uplink message transmitted to the network.

At 520, the UE 560 may receive a downlink data message (e.g., a physical downlink shared channel transmission (PDSCH) transmission) from base station 565-*b* via the second connection (e.g., NR connection). In some examples, the UE 560 may provide feedback to the network to indicate if the message was received successfully at the UE 560.

At 525*a*, the UE 560 may transmit fake NACK feedback to the network in situations of low data transfer. Fake NACK feedback may indicate to the network that the downlink message received at 520 was not successfully decoded by the UE 560. The UE 560 may transmit NACK feedback for the downlink transmission even if a CRC has passed for the downlink message. In some examples, the UE 560 may repeatedly transmit the fake NACK feedback to the network (e.g., for multiple downlink messages).

Additionally or alternatively, at 525-*b*, the UE 560 may corrupt uplink data and transmit the corrupted uplink data at 530. In some examples, the UE 560 may transmit the corrupted uplink data even if the UE 560 has no pending uplink data to send. A corrupted uplink message may include a data portion (e.g., including information bits) and an error check portion based on the data portion. However, the error check portion may not correctly correspond to the information bits according to an error checking function. Accordingly, if base station 565-*b* receives the corrupted uplink data message and correctly decodes the bits, the message will fail an error check based on the inconsistency between the information bits and the error check bits (e.g., a CRC portion). In some examples, the UE 560 may repeatedly transmit corrupted uplink data to the network.

In some cases, one or more fake NACK feedback messages or corrupted uplink data messages may trigger a release of the second connection (e.g., NR connection). For example, the network may receive repeated fake NACK feedback, corrupted uplink data, or both from the UE 560 and may determine to release the NR connection. In such an example, at 545, the network may transmit a release message (e.g., SCG release) to the UE 560, and the UE 560 may release the second connection at 550. At 555, the UE 560 may communicate data via the first connection (e.g., LTE connection).

In some cases, repeated fake NACKs, corrupted uplink data, or both may not trigger a release of the second connection at the network. In some such cases, the UE 560 may initiate a release of the second connection. For example, the UE 560 may trigger RLF at 535 and transmit a failure message to the network at 540. In some examples, the UE 560 may trigger RLF after a predetermined time. For example, the UE 560 may trigger RLF based on a counter. The counter may track the number of fake uplink messages (e.g., fake NACK messages or corrupted uplink messages) that have been sent to the network. If the number of fake uplink messages reaches a threshold, the UE 560 may trigger RLF. In response to the failure message, the network may transmit a release message (e.g., SCG release) to the UE 560 at 545, and the UE 560 may release the second connection at 550. At 555, the UE 560 may communicate data via the first connection (e.g., LTE connection).

Figure 6:
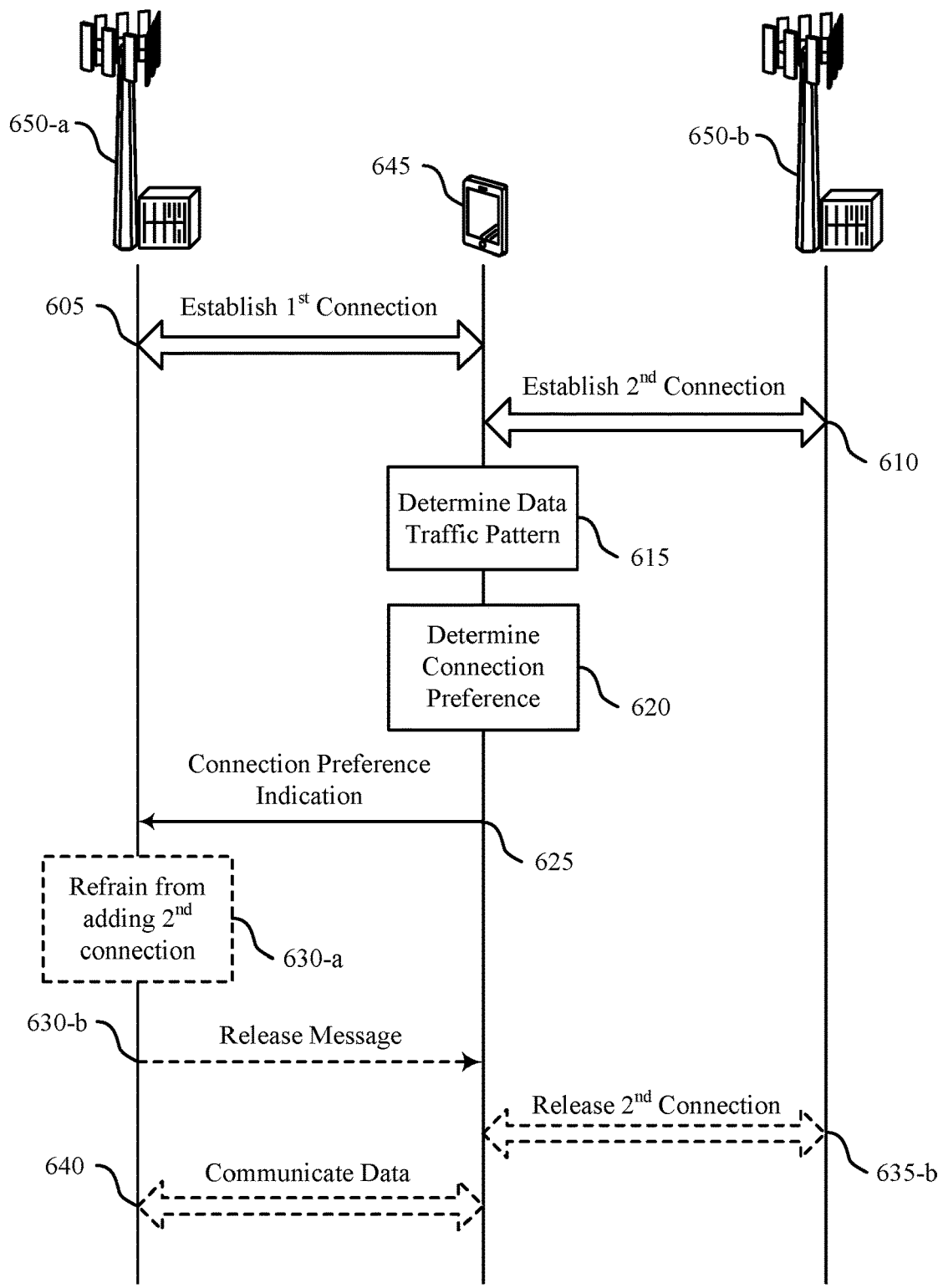

FIG. 6 illustrates an example of a process flow 600 that supports techniques for triggering RAT fall back at a UE based on data traffic information in accordance with various aspects of the present disclosure. In some examples, the process flow 600 may implements aspects of wireless communications system 100, wireless communications system 200, process flow 300, process flow 400, or process flow 500 as described with reference to FIGS. 1 through 5. The process flow 600 may involve a UE 645 operating in DC mode with base station 650-*a* which may support LTE and base station 650-*b* which may support NR. In some examples, the UE 645 may estimate a data traffic pattern and indicate a preference to the network based on the estimated data traffic pattern. Alternative examples of the following may be implemented, where some steps are performed in a different order then described or are not performed at all. In some cases, a step may include additional features not mentioned below, or further steps may be added.

In some examples, the UE 645 may operate in NSA mode. That is, the UE 645 may establish a first connection at 605 and communicate with the network using the LTE stack via base station 650*a*. Additionally, the UE 645 may establish a second connection at 610 and communicate with the network using the NR stack via base station 650-*b*. Alternatively, the UE 645 may communicate data and control information over an LTE connection with base station 650-*a* (e.g., if the UE 645 does not currently have an established NR connection).

At 615, the UE 645 may estimate a data traffic pattern. In some examples, the UE 645 may estimate the data traffic pattern by analyzing throughput numbers of past communications. The UE 645 may extract data throughput numbers from RLC and/or PDCP layers. In some examples, the UE 645 may classify the data traffic pattern as "high" data transfer or "low" data transfer based on a threshold. That is, if the data transfer rate associated with the data traffic pattern is above the threshold, the data traffic pattern may be classified as "high" data transfer. Alternatively, if the data transfer rate associated with the data traffic pattern is below the threshold, the data traffic pattern may be classified as "low" data transfer. Based on the data traffic pattern, the UE 645 may indicate a preference to communicate on the LTE stack or the NR stack to the network.

At 620, the UE 645 may determine a preference based on the data traffic pattern. For example, if the data transfer associated with the data traffic pattern is consider low (e.g., below a threshold), the UE 645 may prefer to communicate data to the network using the LTE stack (e.g., via the first connection). If the data transfer rate associated with the data traffic pattern is considered high (e.g., greater than or equal to the threshold), the UE 645 may prefer to communicate data to the network using the NR stack (e.g., via the second connection).

At 625, the UE 645 may transmit a preference indication to the network. In the case of low data transfer, the UE 645 may indicate a preference to communicate data over the LTE stack. In the case of high data transfer, the UE 645 may indicate a preference to communicate over the NR stack (or to otherwise refrain from indicating a preference for the LTE stack). In some examples, the UE 645 may transmit the preference indication via base station 650-*a* or base station 650-*b*. In some examples, the network may support dedicated signaling for the preference indication and the preference indication may be signaled to the network via the RRC and/or MAC layer. To support dedicated signaling via RRC, an information element (IE) or sets of IEs may be used to indicate the UE's preferred mode of operation in an RRC message for RRC access service network (ASN). In some cases, the IE or set of IEs may additionally include power information, such as current power, a power consumption rate, etc. Additionally or alternatively, the network may support a downlink message to query the UE 645 for the UE's preferred mode of operation.

To support dedicated signaling via the MAC layer, the UE 645 may support an uplink payload type (e.g., a physical uplink control channel (PUCCH) or a physical uplink shared channel (PUSCH) format type) to provide the UE's preferred mode of operation to the network on a periodic basis or a trigger basis. Additionally or alternatively, the network may support a downlink message to query the UE 645 for the preferred mode of operation. For example, the network may trigger reporting of the UE's preferred mode of operation by transmitting a MAC CE or downlink control information (DCI) message to query the UE 645 for the preferred mode of operation.

Using the dedicated signaling, the UE 645 and network may both identify whether to support data communications for the UE 645 via an LTE connection or an NR connection. In some case, the UE 645 may refrain from transmitting fake information to the network to force NR connection failure based on the network identifying the UE's preferred mode of operation and establishing and/or releasing connections based on the UE's preference.

At 630*a*, if the second connection is not currently established, the network may refrain from adding the second connection based on the preference indication received at 625, and the UE 645 may communicate with the network via the first connection at 640.

If the second connection is currently established, the preference indication may trigger a network-initiated release of the second connection (e.g., NR connection). For example, at 630-*b*, the network may transmit a release message (e.g., SCG release) to the UE 645, and the UE 645 may release the second connection at 635-*b*. At 640, the UE 645 may communicate data via the first connection (e.g., LTE connection).

Figure 7:
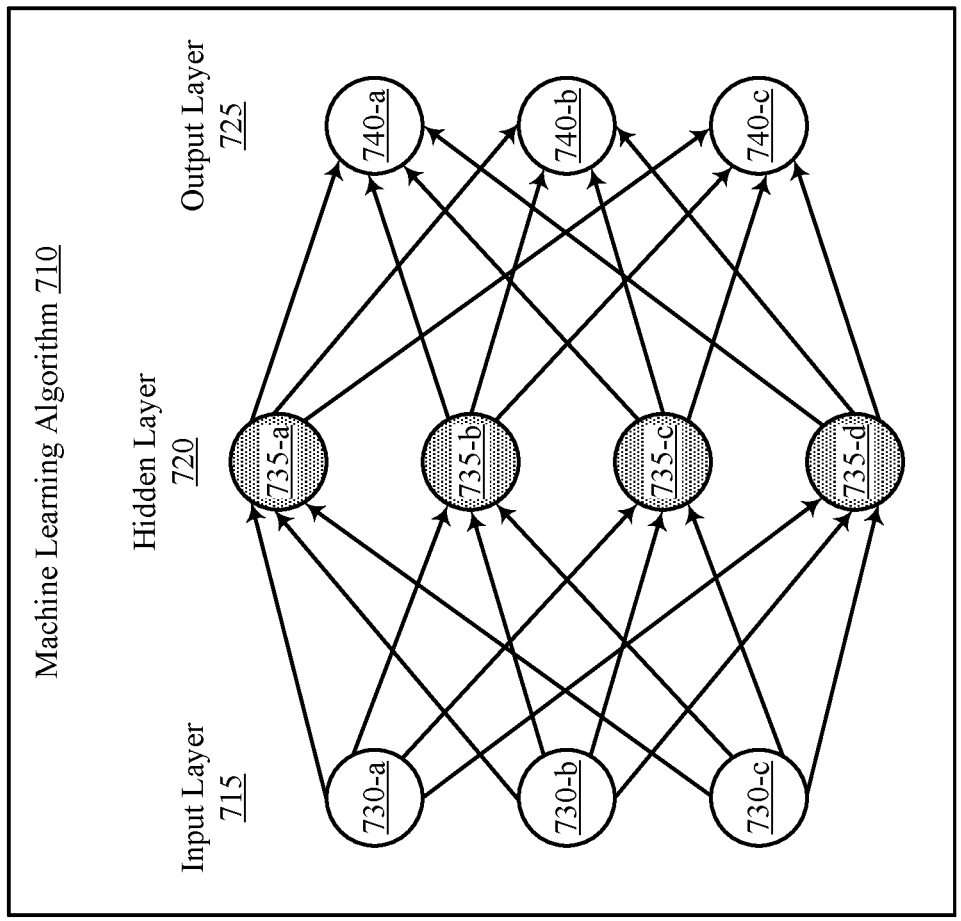
FIG. 7 illustrates an example of a machine learning process that supports techniques for triggering RAT fall back at a UE based on data traffic information in accordance with various aspects of the present disclosure.

FIG. 7 illustrates an example of a machine learning process 700 that supports techniques for triggering RAT fall back at a UE based on data traffic information in accordance with various aspects of the present disclosure. The machine learning process 700 may be implemented at a wireless device, such as a UE as described with reference to FIGS. 1-6. The machine learning process 700 may include a machine learning algorithm 710. In some examples, a UE may implement the machine learning algorithm 710 to improve data traffic predictions for the UE.

As described with reference to FIG. 1, the machine learning process 700 may be implemented at a UE to enhance the prediction of data traffic patterns via the application layer. In some examples, the UE may send input values 705 to the machine learning algorithm 710 for processing. The input values 705 may be values associated with application usage. For example, the input values 705 may be the amount of uplink bytes, the amount of downlink bytes, a type of streaming, a mobility or location of the UE, an antenna configuration, a UE capability, thermal characteristics, screen usage, or any combination of these or other traffic profiling inputs. In some examples, the machine learning algorithm 710 may process the input values 705 and determine output values 745. In some examples, the output values 745 may correspond to a UE state. For example, an output value 745 may be a modified cell capability or modified carrier configuration (e.g., a number of LTE and/or NR carriers supported by the UE based on the current traffic profile). Other potential outputs may include physical layer information, RRC information, a predicted data transfer rate, a preferred mode of operation for the UE, a connection decision (e.g., to fall back to LTE or communicate data via an NR connection), or any combination of these or other potential outputs.

In some examples, the machine learning algorithm 710 may be utilized to create a model for predicting E-UTRA NR DC (ENDC) carrier traffic patterns. For example, the machine learning algorithm 710 may support a profiling cluster for determining whether to enable NR in ENDC based on data traffic predications. That is, the machine learning algorithm 710 may profile metrics of uplink and downlink transactions per application running on the UE. For example, the machine learning algorithm 710 may track metrics of an actual LTE vs. NR traffic split for the applications. Additionally or alternatively, the machine learning algorithm 710 may track metrics related to GPS or location data (e.g., for high mobility vs. stationary scenarios), time-of-day data (e.g., to account for average network load or usage at different times), or a combination of these or other application usage metrics. In some examples, the machine learning algorithm 710 may compare the network transaction thresholds to previously profiled clusters and modify a UE capability or carrier aggregation for data transaction sizes that historically fit efficient usage based on the number of carriers for a given RAT (e.g., LTE or NR). In some cases, an application processor may indicate an NR stack teardown based on the application usage profile (e.g., a multi-variable carrier usage profile). For example, through the interface between the application processor and an NR modem, the application processor may indicate NR stack tear down or establishment based on the context of data patterns for a set of active applications running at the UE (e.g., based on the machine learning algorithm 710). In one example, if the NR modem is in an RRC connected state, deactivation (e.g., tear down) may trigger RLF and transmission of an SCG release message to the network. In another example, if the NR modem is not in the RRC connected state, "tear down" may involve ignoring, delaying, or otherwise aborting a PSCell addition command from the network.

As illustrated, the machine learning algorithm 710 may be an example of a neural net, such as a feed forward (FF) or deep feed forward (DFF) neural network, a recurrent neural network (RNN), a long/short term memory (LSTM) neural network, or any other type of neural network. However, any other machine learning algorithms may be supported by the UE. For example, the machine learning algorithm 710 may implement a nearest neighbor algorithm, a linear regression algorithm, a Naïve Bayes algorithm, a random forest algorithm, or any other machine learning algorithm. Furthermore, the machine learning process 700 may involve supervised learning, unsupervised learning, semi-supervised learning, reinforcement learning, or any combination thereof. The machine learning may be performed prior to deployment of a UE, while the UE is deployed, during low usage periods of the UE while the UE is deployed, or any combination thereof.

The machine learning algorithm 710 may include an input layer 715, one or more hidden layers 720, and an output layer 725. In a fully connected neural network with one hidden layer 720, each hidden layer node 735 may receive a value from each input layer node 730 as input, where each input is weighted. These neural network weights may be based on a cost function that is revised during training of the machine learning algorithm 710. Similarly, each output layer node 740 may receive a value from each hidden layer node 735 as input, where the inputs are weighted. If post-deployment training (e.g., online training) is supported at a UE, the UE may allocate memory to store errors and/or gradients for reverse matrix multiplication. These errors and/or gradients may support updating the machine learning algorithm 710 based on output feedback. Training the machine learning algorithm 710 may support computation of the weights (e.g., connecting the input layer nodes 730 to the hidden layer nodes 735 and the hidden layer nodes 735 to the output layer nodes 740) to map an input pattern to a desired output outcome. This training may result in a UE-specific machine learning algorithm 710 based on the historic application data and data transfer for a specific UE.

The UE may send input values 705 to the machine learning algorithm 710 for processing. The input values 705 may be converted into a set of k input layer nodes 730 at the input layer 715. In some cases, different measurements may be input at different input layer nodes 730 of the input layer 715. Some input layer nodes 730 may be assigned default values (e.g., values of 0) if the number of input layer nodes 730 exceeds the number of inputs corresponding to the input values 705. As illustrated, the input layer 715 may include three input layer nodes 730a, 730-b, and 730-c. However, it is to be understood that the input layer 715 may include any number of input layer nodes 730 (e.g., 20 input nodes).

The machine learning algorithm 710 may convert the input layer 715 to a hidden layer 720 based on a number of input-to-hidden weights between the k input layer nodes 730 and the n hidden layer nodes 735. The machine learning algorithm 710 may include any number of hidden layers 720 as intermediate steps between the input layer 715 and the output layer 725. Additionally, each hidden layer 720 may include any number of nodes. For example, as illustrated, the hidden layer 720 may include four hidden layer nodes 735a, 735-b, 735-c, and 735-d. However, it is to be understood that the hidden layer 720 may include any number of hidden layer nodes 735 (e.g., 10 input nodes). In a fully connected neural network, each node in a layer may be based on each node in the previous layer. For example, the value of hidden layer node 735-a may be based on the values of input layer nodes 730a, 730-b, and 730-c (e.g., with different weights applied to each node value).

The machine learning algorithm 710 may determine values for the output layer nodes 740 of the output layer 725 following one or more hidden layers 720. For example, the machine learning algorithm 710 may convert the hidden layer 720 to the output layer 725 based on a number of hidden-to-output weights between the n hidden layer nodes 735 and the m output layer nodes 740. In some cases, n=m. Each output layer node 740 may correspond to a different output value 745 of the machine learning algorithm 710. As illustrated, the machine learning algorithm 710 may include three output layer nodes 740a, 740-b, and 740-c, supporting three different threshold values. However, it is to be understood that the output layer 725 may include any number of output layer nodes 740 (e.g., 2 output nodes, corresponding to either falling back to LTE or supporting NR data communications). The values determined by the machine learning algorithm 710 for the output layer nodes 740 may correspond to probabilities or other metrics that the UE may use to predict data transfer, determine whether to fall back to LTE operation, or a combination thereof.

Figure 8:
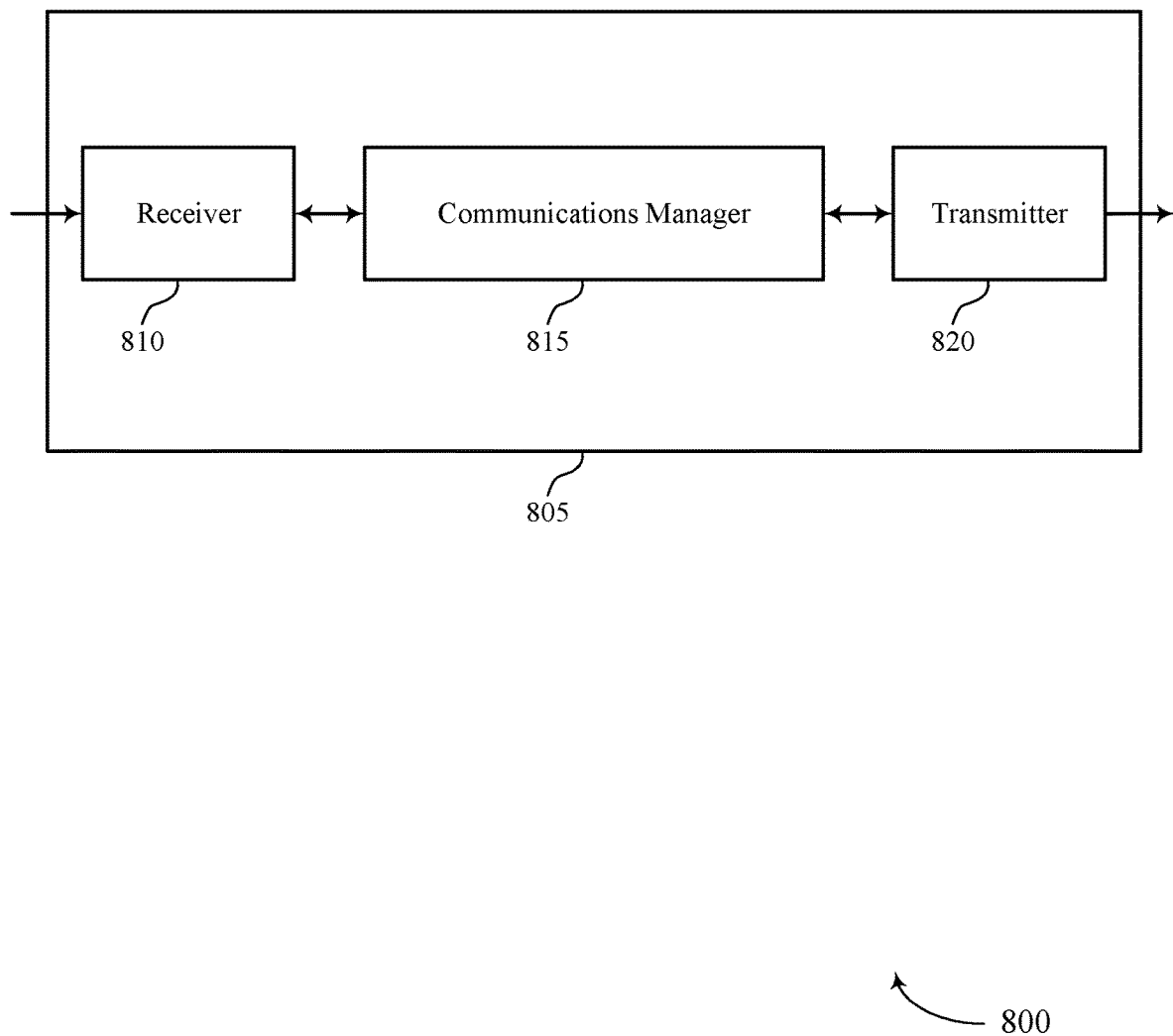
FIGS. 8 and 9 show block diagrams of devices that support techniques for triggering RAT fall back at a UE based on data traffic information in accordance with various aspects of the present disclosure.

FIG. 8 shows a block diagram 800 of a device 805 that supports techniques for triggering RAT fall back at a UE based on data traffic information in accordance with various aspects of the present disclosure. The device 805 may be an example of aspects of a UE as described herein. The device 805 may include a receiver 810, a communications manager 815, and a transmitter 820. The device 805 may also include a processor. Each of these components may be in communication with one another (e.g., via one or more buses).

Figure 11:
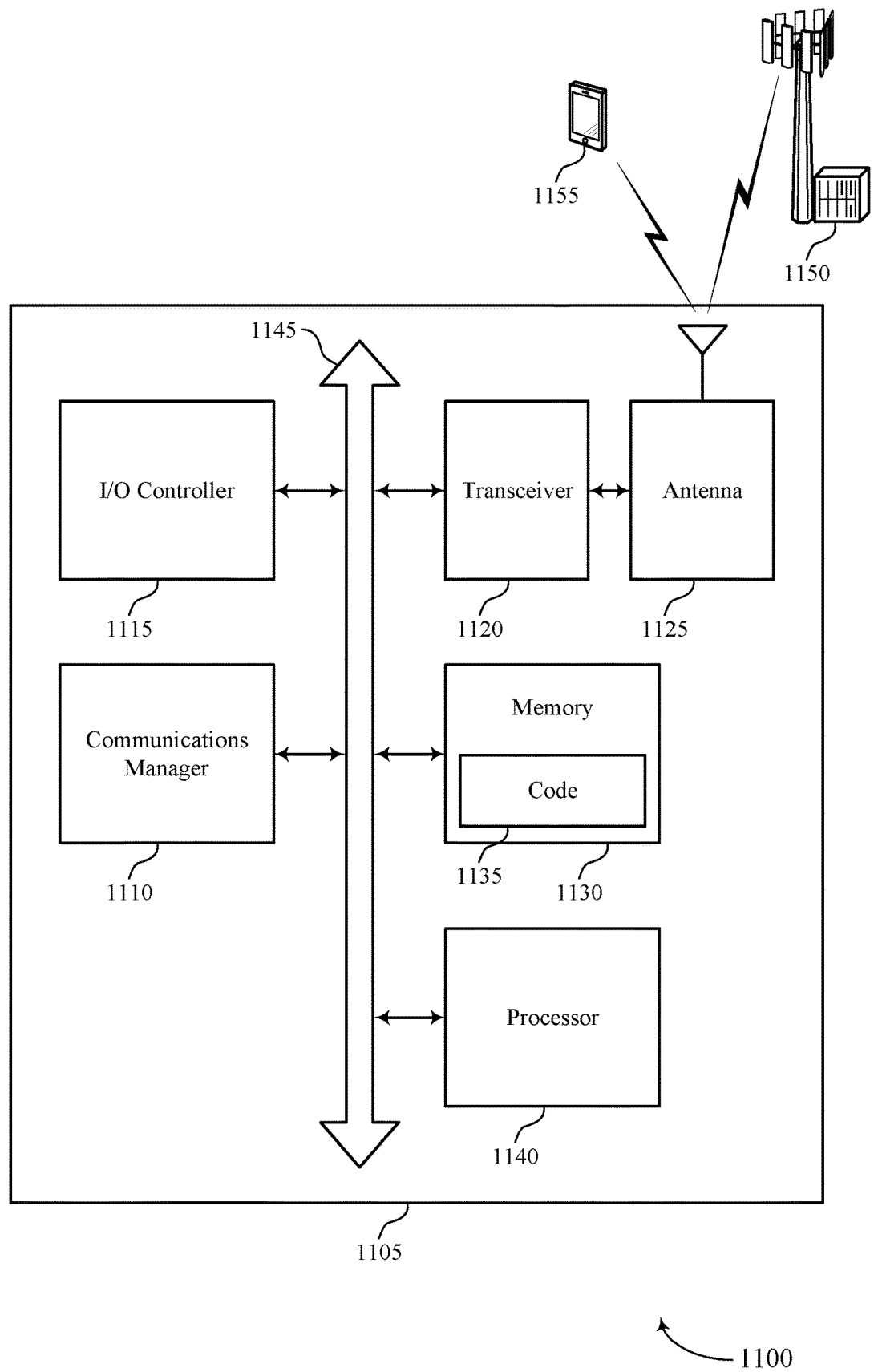
FIG. 11 shows a diagram of a system including a device that supports techniques for triggering RAT fall back at a UE based on data traffic information in accordance with various aspects of the present disclosure.

The receiver 810 may receive information such as packets, user data, or control information associated with various information channels (e.g., control channels, data channels, and information related to techniques for triggering RAT fall back, etc.). Information may be passed on to other components of the device 805. The receiver 810 may be an example of aspects of the transceiver 1120 (as shown in FIG. 11). The receiver 810 may utilize a single antenna or a set of antennas.

The communications manager 815 may be implemented at a UE. In some examples, the communications manager 815 may establish a first connection with a first cell using a first RAT, receive a request message to add a second connection with a second cell using a second RAT different from the first RAT, determine to perform data transfer via the first connection using the first RAT based on data traffic information for the UE, and delay establishing the second connection with the second cell using the second RAT for at least a time duration based on determining to perform the data transfer via the first connection using the first RAT.

Additionally or alternatively, the communications manager 815 may establish, with a network, a first connection with a first cell using a first RAT and a second connection with a second cell using a second RAT different from the first RAT, perform data transfer via the second connection using the second RAT, and determine to fall back to perform the data transfer via the first connection using the first RAT based on data traffic information for the UE. The communications manager 815 may further measure a value for reporting to the network, modify the measured value based on determining to fall back to performing the data transfer via the first connection using the first RAT, and transmit, to the network, a measurement report indicating the modified measured value.

Additionally or alternatively, the communications manager 815 may establish, with a network, a first connection with a first cell using a first RAT and a second connection with a second cell using a second RAT different from the first RAT, perform data transfer via the second connection using the second RAT, and determine to fall back to perform the data transfer via the first connection using the first RAT based on data traffic information for the UE. The communications manager 815 may further identify information for transmission to the network, modify the information based on determining to fall back to performing the data transfer via the first connection using the first RAT, and transmit, to the network, a message including the modified information.

Additionally or alternatively, the communications manager 815 may establish, with a network, a first connection with a first cell using a first RAT, determine to perform data transfer via the first connection using the first RAT instead of via a second connection using a second RAT different from the first RAT based on data traffic information for the UE, transmit, to the network, a message indicating a preferred mode of operation for the UE involving performing the data transfer via the first connection using the first RAT based on the determining, and perform the data transfer via the first connection using the first RAT based on the message indicating the preferred mode of operation for the UE.

The actions performed by the communications manager 815 as described herein may be implemented to realize one or more potential advantages. For example, falling back to perform the data transfer via a first connection using a first RAT (e.g., LTE) may allow the device 805 (e.g., a UE) to reduce a processing overhead associated with maintaining an active NR stack. Reducing the processing overhead may extend the battery life of the UE. Additionally or alternatively, delaying establishing a second connection using a second RAT (e.g., NR), indicating a preferred mode of operation for the UE that involves performing data transfer via the first connection using the first RAT, or both may reduce latency, as the UE may transmit or receive (e.g., via an LTE connection) data pending in a data buffer that may otherwise be held until an NR connection is established.

Based on performing data transfer via a first connection using a first RAT (e.g., LTE), a processor of the device 805 (e.g., a processor controlling the receiver 810, the communications manager 815, the transmitter 820, or some combination thereof) may reduce processing resources used for data transfer procedures, network connection procedures, or both. For example, by reducing an amount of time that the UE keeps both an LTE stack and an NR stack active, the UE may reduce the processing resources used for maintaining multiple connections. Additionally or alternatively, by reducing a number of times the UE sets up and releases an NR connection, the UE may reduce the processing overhead associated with establishing these connections. Reducing the number of NR connection procedures may reduce a number of times the processor ramps up processing power and turns on processing units to handle network connection (e.g., 5G network connection) procedures in an NSA mode.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver. For example, the transmitter 820 may be an example of aspects of the transceiver 1120 (as shown in FIG. 11). The transmitter 820 may utilize a single antenna or a set of antennas.

Figure 9:
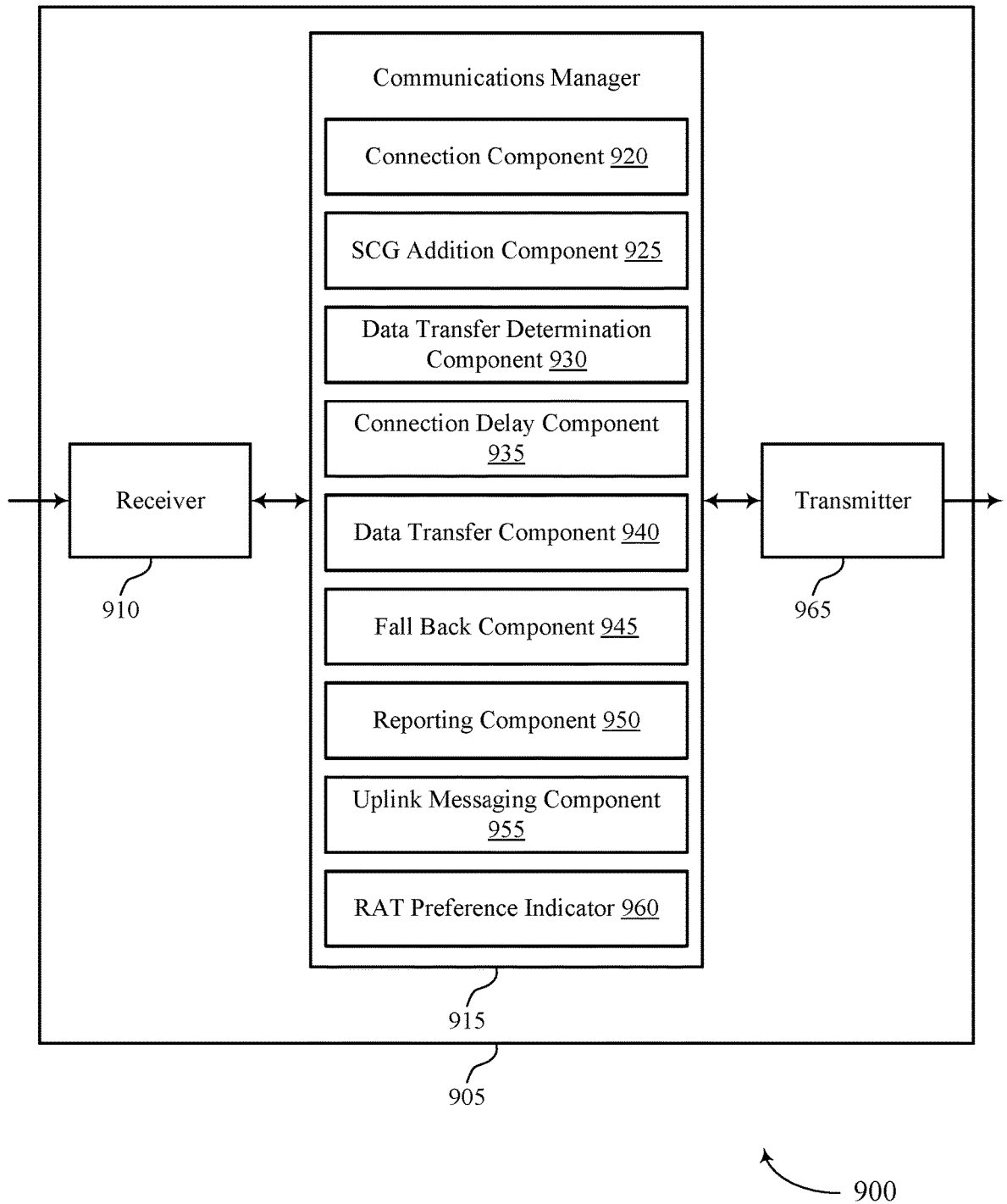

FIG. 9 shows a block diagram 900 of a device 905 that supports techniques for triggering RAT fall back at a UE based on data traffic information in accordance with various aspects of the present disclosure. The device 905 may be an example of aspects of a device 805 (as shown in FIG. 8) or a UE as described herein. The device 905 may include a receiver 910, a communications manager 915, and a transmitter 965. The device 905 may also include a processor. Each of these components may be in communication with one another (e.g., via one or more buses).

The receiver 910 may receive information such as packets, user data, or control information associated with various information channels (e.g., control channels, data channels, and information related to techniques for triggering RAT fall back, etc.). Information may be passed on to other components of the device 905. The receiver 910 may be an example of aspects of the transceiver 1120 (as shown in FIG. 11). The receiver 910 may utilize a single antenna or a set of antennas.

The communications manager 915 may be an example of aspects of the communications manager 815 (as shown in FIG. 8). The communications manager 915 may include a connection component 920, an SCG addition component 925, a data transfer determination component 930, a connection delay component 935, a data transfer component 940, a fall back component 945, a reporting component 950, an uplink messaging component 955, a RAT preference indicator 960, or a combination thereof. The communications manager 915 may be implemented at a UE.

In some examples, the connection component 920 may establish a first connection with a first cell using a first RAT. The SCG addition component 925 may receive a request message to add a second connection with a second cell using a second RAT different from the first RAT. The data transfer determination component 930 may determine to perform data transfer via the first connection using the first RAT based on data traffic information for the UE. The connection delay component 935 may delay establishing the second connection with the second cell using the second RAT for at least a time duration based on determining to perform the data transfer via the first connection using the first RAT.

Additionally or alternatively, the connection component 920 may establish, with a network, a first connection with a first cell using a first RAT and a second connection with a second cell using a second RAT different from the first RAT. The data transfer component 940 may perform data transfer via the second connection using the second RAT. The fall back component 945 may determine to fall back to perform the data transfer via the first connection using the first RAT based on data traffic information for the UE. The reporting component 950 may measure a value for reporting to the network, modify the measured value based on determining to fall back to performing the data transfer via the first connection using the first RAT, and transmit, to the network, a measurement report indicating the modified measured value.

Additionally or alternatively, the connection component 920 may establish, with a network, a first connection with a first cell using a first RAT and a second connection with a second cell using a second RAT different from the first RAT.

The data transfer component 940 may perform data transfer via the second connection using the second RAT. The fall back component 945 may determine to fall back to perform the data transfer via the first connection using the first RAT based on data traffic information for the UE. The uplink messaging component 955 may identify information for transmission to the network, modify the information based on determining to fall back to performing the data transfer via the first connection using the first RAT, and transmit, to the network, a message including the modified information.

Additionally or alternatively, the connection component 920 may establish, with a network, a first connection with a first cell using a first RAT. The data transfer determination component 930 may determine to perform data transfer via the first connection using the first RAT instead of via a second connection using a second RAT different from the first RAT based on data traffic information for the UE. The RAT preference indicator 960 may transmit, to the network, a message indicating a preferred mode of operation for the UE involving performing the data transfer via the first connection using the first RAT based on the determining. The data transfer component 940 may perform the data transfer via the first connection using the first RAT based on the message indicating the preferred mode of operation for the UE.

The transmitter 965 may transmit signals generated by other components of the device 905. In some examples, the transmitter 965 may be collocated with a receiver 910 in a transceiver. For example, the transmitter 965 may be an example of aspects of the transceiver 1120 (as shown in FIG. 11). The transmitter 965 may utilize a single antenna or a set of antennas.

Figure 10:
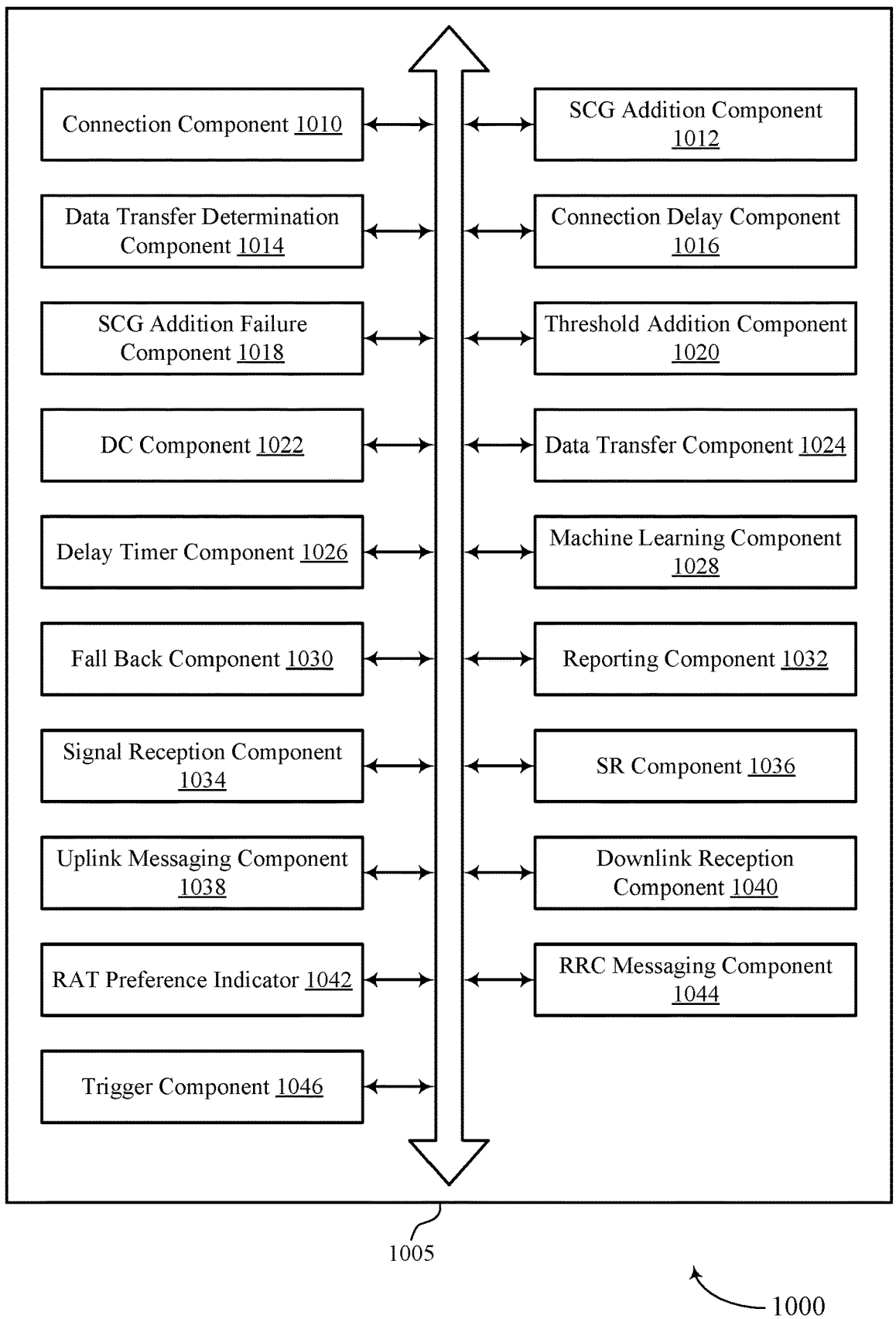
FIG. 10 shows a block diagram of a communications manager that supports techniques for triggering RAT fall back at a UE based on data traffic information in accordance with various aspects of the present disclosure.

FIG. 10 shows a block diagram 1000 of a communications manager 1005 that supports techniques for triggering RAT fall back at a UE based on data traffic information in accordance with various aspects of the present disclosure. The communications manager 1005 may be an example of aspects of a communications manager 815, a communications manager 915, or a communications manager 1110 described herein (as shown in FIGS. 8, 9, and 11, respectively). The communications manager 1005 may include a connection component 1010, an SCG addition component 1012, a data transfer determination component 1014, a connection delay component 1016, an SCG addition failure component 1018, a threshold addition component 1020, a DC component 1022, a data transfer component 1024, a delay timer component 1026, a machine learning component 1028, a fall back component 1030, a reporting component 1032, a signal reception component 1034, an SR component 1036, an uplink messaging component 1038, a downlink reception component 1040, a RAT preference indicator 1042, an RRC messaging component 1044, a trigger component 1046, or a combination thereof. Each of these components may communicate, directly or indirectly, with one another (e.g., via one or more buses).

The communications manager 1005 may support wireless communications at a UE.

In some examples, the connection component 1010 may establish a first connection with a first cell using a first RAT. The SCG addition component 1012 may receive a request message to add a second connection with a second cell using a second RAT different from the first RAT. The data transfer determination component 1014 may determine to perform data transfer via the first connection using the first RAT based on data traffic information for the UE. The connection delay component 1016 may delay establishing the second connection with the second cell using the second RAT for at least a time duration based on determining to perform the data transfer via the first connection using the first RAT.

In some examples, delaying establishing the second connection may involve the SCG addition failure component 1018 transmitting, in response to the request message, a failure message indicating a failure to add the second connection with the second cell using the second RAT based on determining to perform the data transfer via the first connection using the first RAT.

In some examples, the SCG addition component 1012 may receive one or more additional request messages to add the second connection with the second cell using the second RAT based on the failure message. In some such examples, the threshold addition component 1020 may determine that a number of additional request messages of the one or more additional request messages satisfies a threshold number of request messages. In some examples, the connection component 1010 may establish the second connection with the second cell using the second RAT based on the number of additional request messages satisfying the threshold number of request messages. In some such examples, the DC component 1022 may operate in a DC mode for the first RAT and the second RAT based on the established first connection and the established second connection.

In some examples, delaying establishing the second connection may involve the connection delay component 1016 delaying a search process for the second cell, an acquisition process for the second cell, or both for the time duration based on determining to perform the data transfer via the first connection using the first RAT. In some such examples, the data transfer component 1024 may perform the data transfer via the first connection using the first RAT during the time duration.

In some examples, the delay timer component 1026 may activate a timer based on receiving the request message, where the timer runs for the time duration, and may perform the search process for the second cell, the acquisition process for the second cell, or both prior to or based on an expiry of the timer or a change in data traffic rate. In some examples, the connection component 1010 may establish the second connection with the second cell using the second RAT based on performing the search process for the second cell, the acquisition process for the second cell, or both. In some such examples, the DC component 1022 may operate in a DC mode for the first RAT and the second RAT based on the established first connection and the established second connection.

In some examples, the data transfer determination component 1014 may estimate a data traffic pattern for the UE based on the data traffic information for the UE for a preceding time period and may compare the estimated data traffic pattern to a data rate threshold, where determining to perform the data transfer via the first connection using the first RAT is based on the estimated data traffic pattern failing to satisfy the data rate threshold.

In some examples, the data transfer determination component 1014 may analyze RLC data, PDCP data, application layer data traffic for one or more applications running at the UE, or a combination thereof to determine the data traffic information for the UE for the preceding time period.

In some examples, estimating the data traffic pattern for the UE may involve the machine learning component 1028 inputting at least the application layer data traffic as an input to a machine-learned model and receiving, as an output of the machine-learned model, the estimated data traffic pattern, a decision metric indicating to perform the data transfer via the first connection using the first RAT, or a combination thereof.

In some cases, the input to the machine-learned model may include an uplink traffic amount, a downlink traffic amount, a data streaming type, location information for the UE, an antenna configuration for the UE, a UE capability for the UE, thermal information for the UE, screen usage information for the UE, or a combination thereof.

In some examples, the data transfer determination component 1014 may identify a criterion for performing the data transfer via the first connection using the first RAT, an indication of the time duration, or a combination thereof based on an RRC configuration message, a DCI message, a pre-configuration for the UE, or a combination thereof.

Additionally or alternatively, the connection component 1010 may establish, with a network, a first connection with a first cell using a first RAT and a second connection with a second cell using a second RAT different from the first RAT. The data transfer component 1024 may perform data transfer via the second connection using the second RAT. The fall back component 1030 may determine to fall back to perform the data transfer via the first connection using the first RAT based on data traffic information for the UE. The reporting component 1032 may measure a value for reporting to the network, may modify the measured value based on determining to fall back to performing the data transfer via the first connection using the first RAT, and may transmit, to the network, a measurement report indicating the modified measured value.

In some examples, the signal reception component 1034 may receive an SSB for the second RAT. In some such examples, the reporting component 1032 may measure a channel quality value for the SSB, may decrease the measured channel quality value based on determining to fall back to performing the data transfer via the first connection using the first RAT, and may transmit an SSB measurement report indicating the decreased measured channel quality value. In some cases, the channel quality value may be an example of an RSRQ, an SNR, an SINR, or a combination thereof.

In some examples, the signal reception component 1034 may receive a CSI-RS for the second RAT. In some such examples, the reporting component 1032 may determine an indicator value for the CSI-RS, may decrease the indicator value based on determining to fall back to performing the data transfer via the first connection using the first RAT, and may transmit a CSI measurement report indicating the decreased indicator value. In some cases, the indicator value may be a CQI value, an RI value, a layer 1 (LI) value, a pre-coding matrix indicator (PMI) value, or a combination of these or other measurement parameters.

In some examples, the reporting component 1032 may measure an amount of pending uplink data in a buffer, may decrease the measured amount of pending uplink data in the buffer (e.g., to zero) based on determining to fall back to performing the data transfer via the first connection using the first RAT, and may transmit a buffer status report indicating the decreased measured amount of pending uplink data in the buffer. In some examples, the SR component 1036 may refrain from transmitting an SR to the network for the pending uplink data in the buffer based on determining to fall back to performing the data transfer via the first connection using the first RAT.

In some examples, the fall back component 1030 may receive, from the network, a release message for the second connection using the second RAT based on the measurement report indicating the modified measured value.

In some other examples, the fall back component 1030 may trigger RLF for the second connection using the second RAT based on determining to fall back to performing the data transfer via the first connection using the first RAT and may transmit, to the network, a failure message indicating a failure of the second connection using the second RAT based on the triggered radio link failure.

Additionally or alternatively, the connection component 1010 may establish, with a network, a first connection with a first cell using a first RAT and a second connection with a second cell using a second RAT different from the first RAT. The data transfer component 1024 may perform data transfer via the second connection using the second RAT. The fall back component 1030 may determine to fall back to perform the data transfer via the first connection using the first RAT based on data traffic information for the UE. The uplink messaging component 1038 may identify information for transmission to the network, may modify the information based on determining to fall back to performing the data transfer via the first connection using the first RAT, and may transmit, to the network, a message including the modified information.

In some examples, the downlink reception component 1040 may receive, from the network, a downlink data message and may successfully decode the downlink data message. In some such examples, the uplink messaging component 1038 may identify a feedback message indicating positive acknowledgment for the downlink data message based on successfully decoding the downlink data message. The uplink messaging component 1038 may modify the feedback message to indicate negative acknowledgment for the downlink data message based on determining to fall back to performing the data transfer via the first connection using the first RAT and may transmit the modified feedback message indicating negative acknowledgment for the downlink data message.

In some examples, the uplink messaging component 1038 may determine to transmit corrupted uplink data based on determining to fall back to performing the data transfer via the first connection using the first RAT. The uplink messaging component 1038 may generate a corrupted uplink data message based on determining to transmit the corrupted uplink data and may transmit the corrupted uplink data message. In some cases, the corrupted uplink data message includes an information portion and a CRC portion, the CRC portion failing to correspond to the information portion according to a checking function.

In some examples, the fall back component 1030 may receive, from the network, a release message for the second connection using the second RAT based on the message including the modified information.

In some other examples, the fall back component 1030 may trigger RLF for the second connection using the second RAT based on determining to fall back to performing the data transfer via the first connection using the first RAT and may transmit, to the network, a failure message indicating a failure of the second connection using the second RAT based on the triggered radio link failure.

Additionally or alternatively, the connection component 1010 may establish, with a network, a first connection with a first cell using a first RAT. The data transfer determination component 1014 may determine to perform data transfer via the first connection using the first RAT instead of via a second connection using a second RAT different from the first RAT based on data traffic information for the UE. The RAT preference indicator 1042 may transmit, to the network, a message indicating a preferred mode of operation for the UE involving performing the data transfer via the first connection using the first RAT based on the determining. The data transfer component 1024 may perform the data transfer via the first connection using the first RAT based on the message indicating the preferred mode of operation for the UE.

In some examples, the message may be an RRC message, and the RRC messaging component 1044 may generate the RRC message including one or more IEs indicating the preferred mode of operation for the UE, a current power level of the UE, a power consumption rate of the UE, or a combination thereof. The trigger component 1046 may receive, from the network, a downlink message querying the UE for the RRC message, where the RRC message may be transmitted based on the downlink message.

In some examples, the message may be an uplink control message, and the uplink messaging component 1038 may generate a payload for the uplink control message including the preferred mode of operation for the UE. The trigger component 1046 may receive, from the network, a MAC-CE, a DCI message, or a combination thereof querying the UE for the uplink control message, where the uplink control message may be transmitted based on the MAC-CE, the DCI message, or a combination thereof.

FIG. 11 shows a diagram of a system 1100 including a device 1105 that supports techniques for triggering RAT fall back at a UE based on data traffic information in accordance with various aspects of the present disclosure. The device 1105 may be an example of or include the components of a device 805 (as shown in FIG. 8), a device 905 (as shown in FIG. 9), or a UE as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may be implemented at a UE. In some cases, the communications manager 1110 may be an example of a communications manager 815, a communications manager 915, or a communications manager 1005 (as shown in FIGS. 8, 9, and 10, respectively).

In some examples, the communications manager 1110 may establish a first connection with a first cell using a first RAT, receive a request message to add a second connection with a second cell using a second RAT different from the first RAT, determine to perform data transfer via the first connection using the first RAT based on data traffic information for the UE, and delay establishing the second connection with the second cell using the second RAT for at least a time duration based on determining to perform the data transfer via the first connection using the first RAT.

Additionally or alternatively, the communications manager 1110 may establish, with a network, a first connection with a first cell using a first RAT and a second connection with a second cell using a second RAT different from the first RAT, perform data transfer via the second connection using the second RAT, determine to fall back to perform the data transfer via the first connection using the first RAT based on data traffic information for the UE, measure a value for reporting to the network, modify the measured value based on determining to fall back to performing the data transfer via the first connection using the first RAT, and transmit, to the network, a measurement report indicating the modified measured value.

Additionally or alternatively, the communications manager 1110 may establish, with a network, a first connection with a first cell using a first RAT and a second connection with a second cell using a second RAT different from the first RAT, perform data transfer via the second connection using the second RAT, determine to fall back to perform the data transfer via the first connection using the first RAT based on data traffic information for the UE, identify information for transmission to the network, modify the information based on determining to fall back to performing the data transfer via the first connection using the first RAT, and transmit, to the network, a message including the modified information.

Additionally or alternatively, the communications manager 1110 may establish, with a network, a first connection with a first cell using a first RAT, determine to perform data transfer via the first connection using the first RAT instead of via a second connection using a second RAT different from the first RAT based on data traffic information for the UE, transmit, to the network, a message indicating a preferred mode of operation for the UE involving performing the data transfer via the first connection using the first RAT based on the determining, and perform the data transfer via the first connection using the first RAT based on the message indicating the preferred mode of operation for the UE.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions. For example, the wireless device may communicate with one or more base stations 1150, one or more UEs 1155, or a combination thereof.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for triggering RAT fall back at a UE based on data traffic information).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
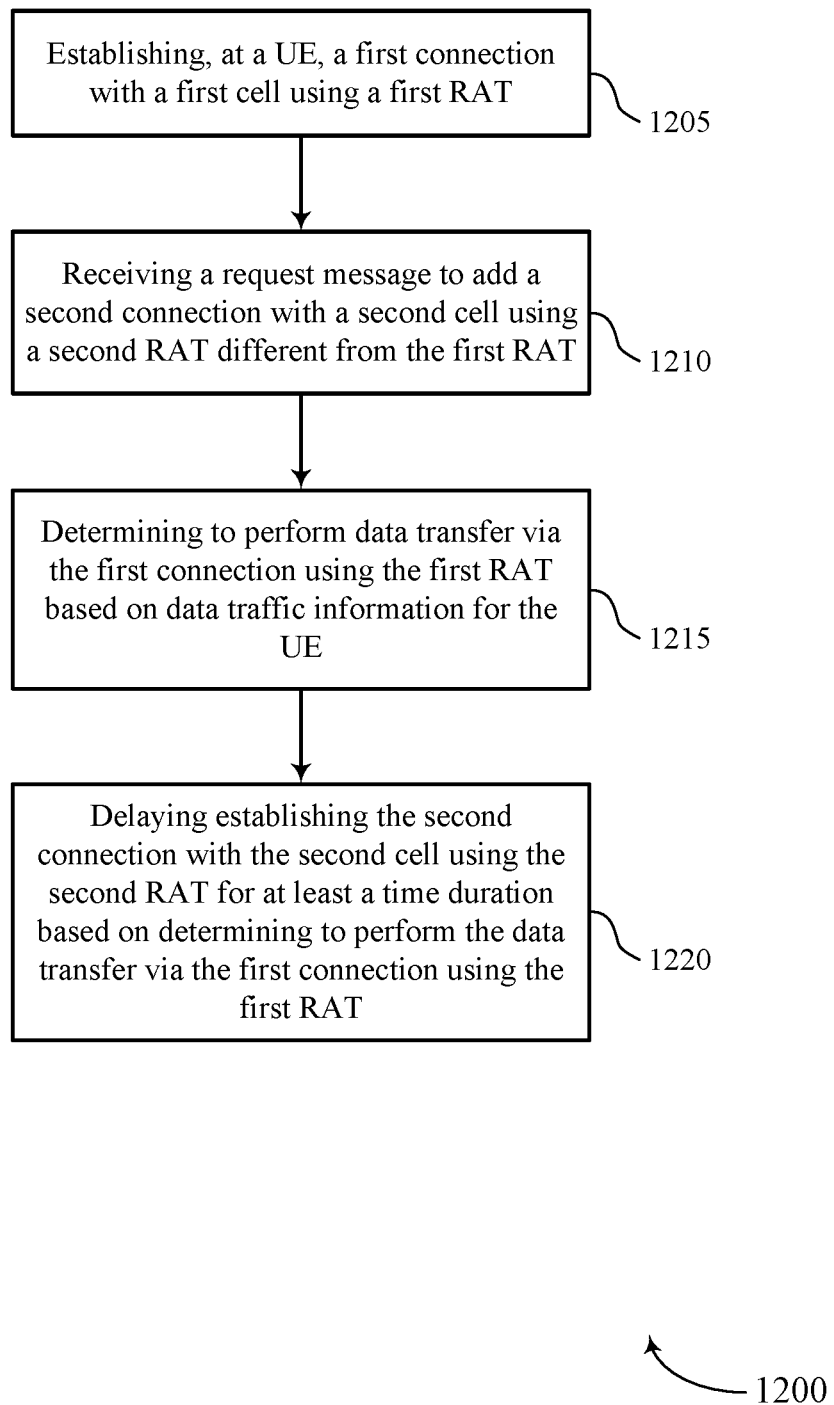
FIGS. 12 through 15 show flowcharts illustrating methods that support techniques for triggering RAT fall back at a UE based on data traffic information in accordance with various aspects of the present disclosure.

FIG. 12 shows a flowchart illustrating a method 1200 that supports techniques for triggering RAT fall back at a UE based on data traffic information in accordance with various aspects of the present disclosure. The operations of method 1200 may be implemented by a UE or its components as described herein. For example, the operations of method 1200 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1205, the UE may establish a first connection with a first cell using a first RAT. The operations of 1205 may be performed according to the methods described herein. In some examples, aspects of the operations of 1205 may be performed by a connection component as described with reference to FIGS. 8 through 11.

At 1210, the UE may receive a request message to add a second connection with a second cell using a second RAT different from the first RAT. The operations of 1210 may be performed according to the methods described herein. In some examples, aspects of the operations of 1210 may be performed by an SCG addition component as described with reference to FIGS. 8 through 11.

At 1215, the UE may determine to perform data transfer via the first connection using the first RAT based on data traffic information for the UE. The operations of 1215 may be performed according to the methods described herein. In some examples, aspects of the operations of 1215 may be performed by a data transfer determination component as described with reference to FIGS. 8 through 11.

At 1220, the UE may delay establishing the second connection with the second cell using the second RAT for at least a time duration based on determining to perform the data transfer via the first connection using the first RAT. The operations of 1220 may be performed according to the methods described herein. In some examples, aspects of the operations of 1220 may be performed by a connection delay component as described with reference to FIGS. 8 through 11.

Figure 13:
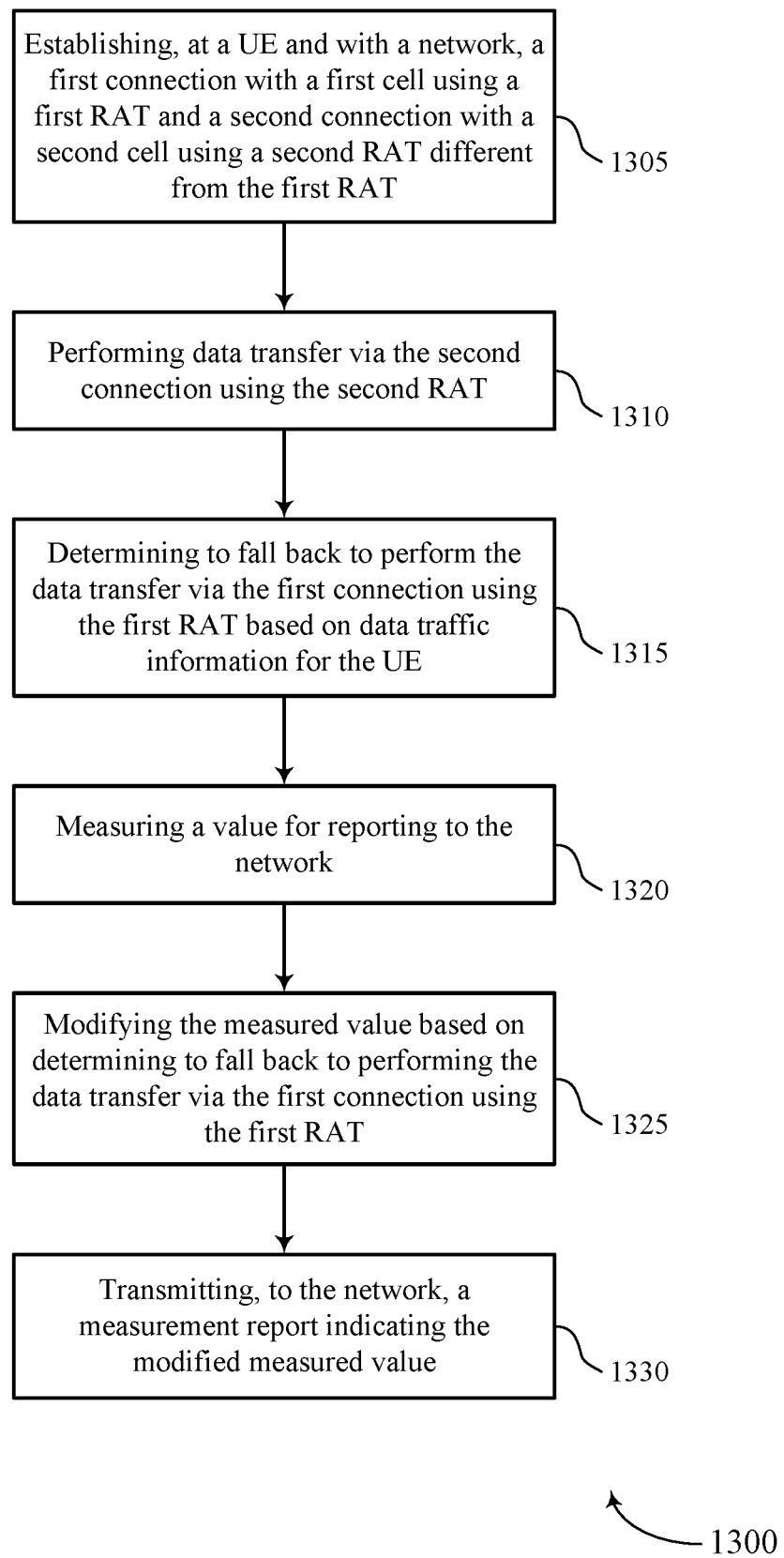

FIG. 13 shows a flowchart illustrating a method 1300 that supports techniques for triggering RAT fall back at a UE based on data traffic information in accordance with various aspects of the present disclosure. The operations of method 1300 may be implemented by a UE or its components as described herein. For example, the operations of method 1300 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1305, the UE may establish, with a network, a first connection with a first cell using a first RAT and a second connection with a second cell using a second RAT different from the first RAT. The operations of 1305 may be performed according to the methods described herein. In some examples, aspects of the operations of 1305 may be performed by a connection component as described with reference to FIGS. 8 through 11.

At 1310, the UE may perform data transfer via the second connection using the second RAT. The operations of 1310 may be performed according to the methods described herein. In some examples, aspects of the operations of 1310 may be performed by a data transfer component as described with reference to FIGS. 8 through 11.

At 1315, the UE may determine to fall back to perform the data transfer via the first connection using the first RAT based on data traffic information for the UE. The operations of 1315 may be performed according to the methods described herein. In some examples, aspects of the operations of 1315 may be performed by a fall back component as described with reference to FIGS. 8 through 11.

At 1320, the UE may measure a value for reporting to the network. The operations of 1320 may be performed according to the methods described herein. In some examples, aspects of the operations of 1320 may be performed by a reporting component as described with reference to FIGS. 8 through 11.

At 1325, the UE may modify the measured value based on determining to fall back to performing the data transfer via the first connection using the first RAT. The operations of 1325 may be performed according to the methods described herein. In some examples, aspects of the operations of 1325 may be performed by a reporting component as described with reference to FIGS. 8 through 11.

At 1330, the UE may transmit, to the network, a measurement report indicating the modified measured value. The operations of 1330 may be performed according to the methods described herein. In some examples, aspects of the operations of 1330 may be performed by a reporting component as described with reference to FIGS. 8 through 11.

Figure 14:
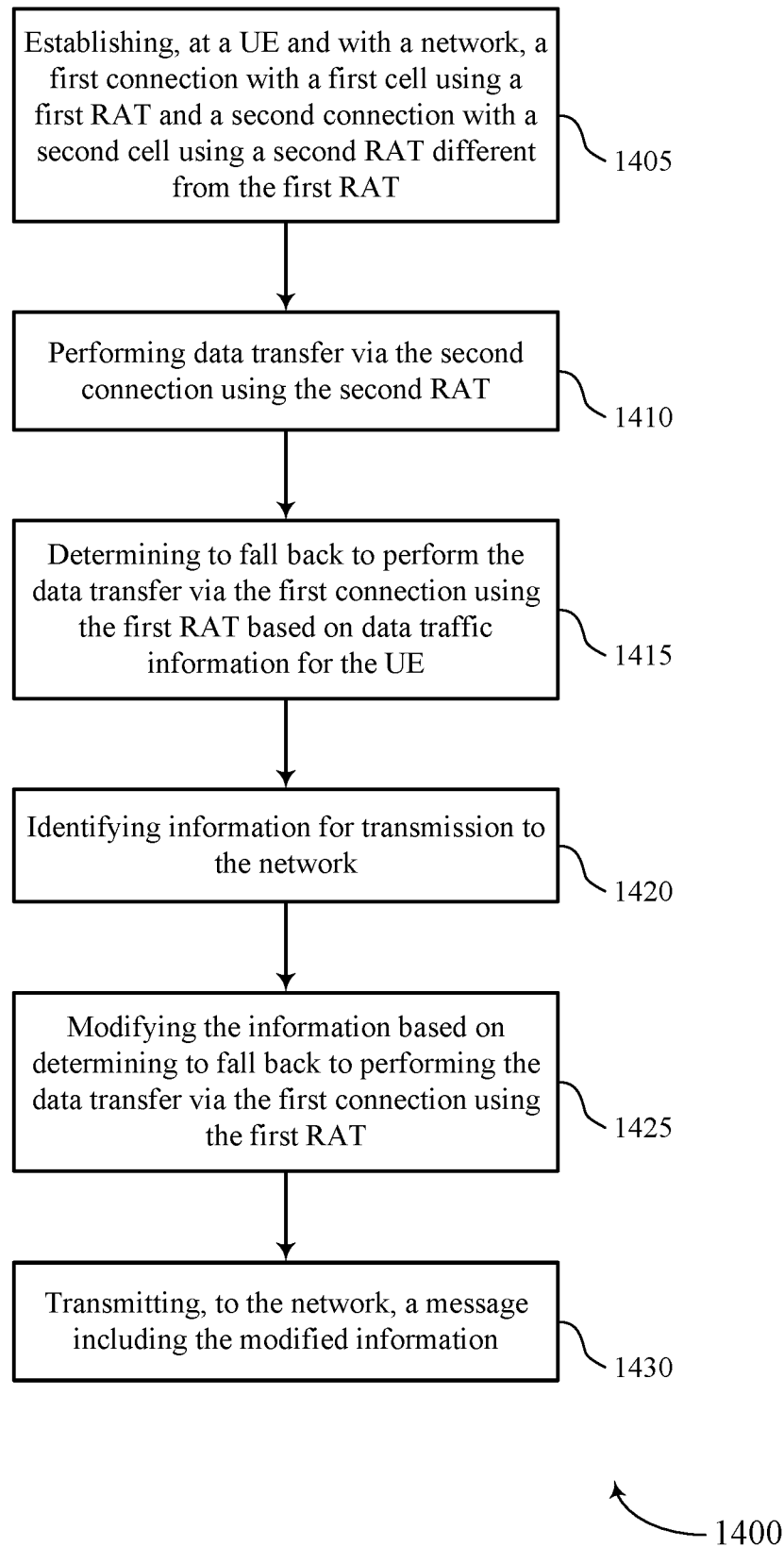

FIG. 14 shows a flowchart illustrating a method 1400 that supports techniques for triggering RAT fall back at a UE based on data traffic information in accordance with various aspects of the present disclosure. The operations of method 1400 may be implemented by a UE or its components as described herein. For example, the operations of method 1400 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1405, the UE may establish, with a network, a first connection with a first cell using a first RAT and a second connection with a second cell using a second RAT different from the first RAT. The operations of 1405 may be performed according to the methods described herein. In some examples, aspects of the operations of 1405 may be performed by a connection component as described with reference to FIGS. 8 through 11.

At 1410, the UE may perform data transfer via the second connection using the second RAT. The operations of 1410 may be performed according to the methods described herein. In some examples, aspects of the operations of 1410 may be performed by a data transfer component as described with reference to FIGS. 8 through 11.

At 1415, the UE may determine to fall back to perform the data transfer via the first connection using the first RAT based on data traffic information for the UE. The operations of 1415 may be performed according to the methods described herein. In some examples, aspects of the operations of 1415 may be performed by a fall back component as described with reference to FIGS. 8 through 11.

At 1420, the UE may identify information for transmission to the network. The operations of 1420 may be performed according to the methods described herein. In some examples, aspects of the operations of 1420 may be performed by an uplink messaging component as described with reference to FIGS. 8 through 11.

At 1425, the UE may modify the information based on determining to fall back to performing the data transfer via the first connection using the first RAT. The operations of 1425 may be performed according to the methods described herein. In some examples, aspects of the operations of 1425 may be performed by an uplink messaging component as described with reference to FIGS. 8 through 11.

At 1430, the UE may transmit, to the network, a message including the modified information. The operations of 1430 may be performed according to the methods described herein. In some examples, aspects of the operations of 1430 may be performed by an uplink messaging component as described with reference to FIGS. 8 through 11.

Figure 15:
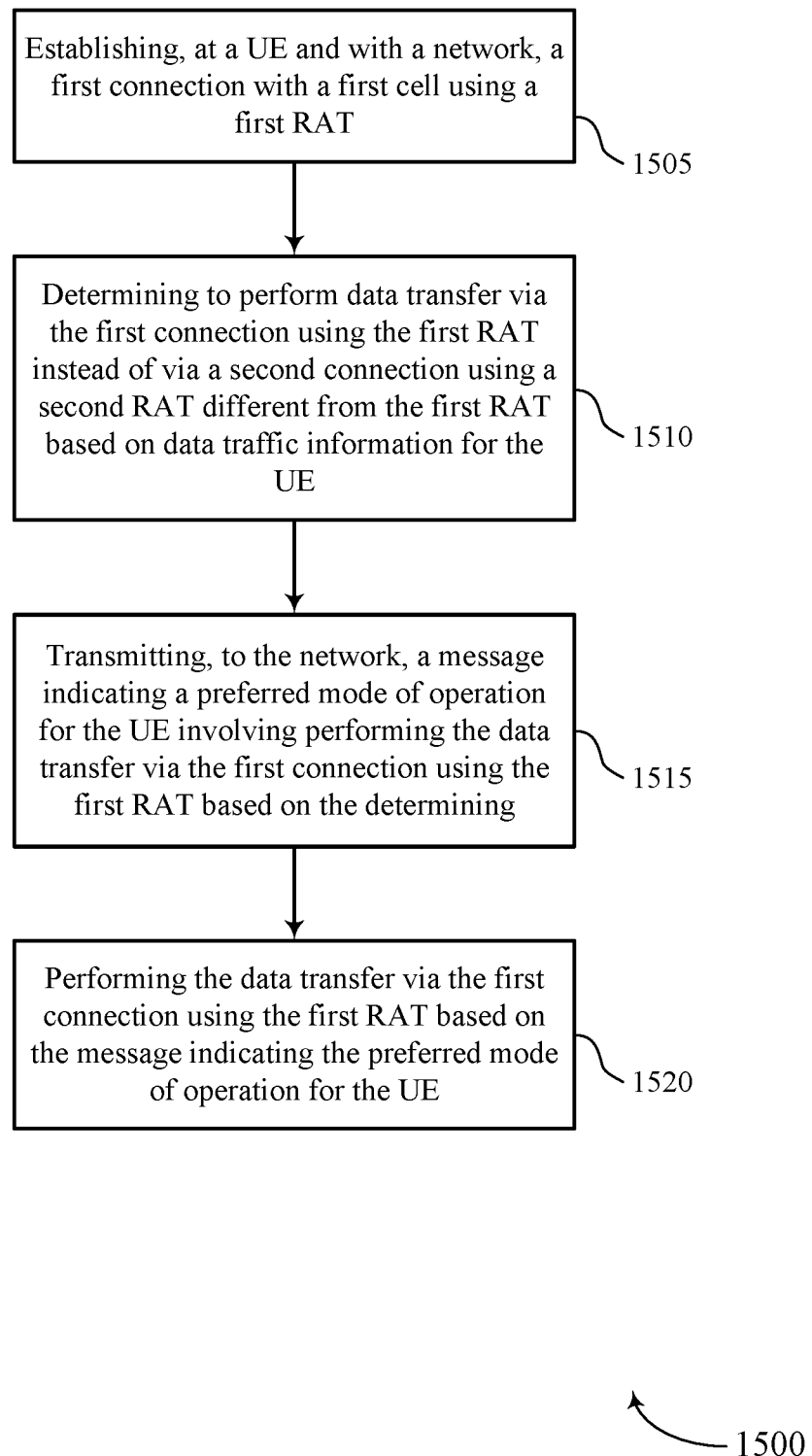

FIG. 15 shows a flowchart illustrating a method 1500 that supports techniques for triggering RAT fall back at a UE based on data traffic information in accordance with various aspects of the present disclosure. The operations of method 1500 may be implemented by a UE or its components as described herein. For example, the operations of method 1500 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1505, the UE may establish, with a network, a first connection with a first cell using a first RAT. The operations of 1505 may be performed according to the methods described herein. In some examples, aspects of the operations of 1505 may be performed by a connection component as described with reference to FIGS. 8 through 11.

At 1510, the UE may determine to perform data transfer via the first connection using the first RAT instead of via a second connection using a second RAT different from the first RAT based on data traffic information for the UE. The operations of 1510 may be performed according to the methods described herein. In some examples, aspects of the operations of 1510 may be performed by a data transfer determination component as described with reference to FIGS. 8 through 11.

At 1515, the UE may transmit, to the network, a message indicating a preferred mode of operation for the UE involving performing the data transfer via the first connection using the first RAT based on the determining. The operations of 1515 may be performed according to the methods described herein. In some examples, aspects of the operations of 1515 may be performed by a RAT preference indicator as described with reference to FIGS. 8 through 11.

At 1520, the UE may perform the data transfer via the first connection using the first RAT based on the message indicating the preferred mode of operation for the UE. The operations of 1520 may be performed according to the methods described herein. In some examples, aspects of the operations of 1520 may be performed by a data transfer component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    establishing a first connection with a first cell using a first radio access technology (RAT);
    receiving a first request message to add a second connection with a second cell using a second RAT different from the first RAT;
    determining to perform data transfer via the first connection using the first RAT based at least in part on data traffic information for the UE;
    delaying establishing the second connection with the second cell using the second RAT for at least a time duration based at least in part on determining to perform the data transfer via the first connection using the first RAT, wherein delaying establishing the second connection includes:
        transmitting, in response to the first request message, a failure message indicating a failure to add the second connection with the second cell using the second RAT;
    receiving one or more second request messages to add the second connection with the second cell using the second RAT based at least in part on the failure message;
    establishing, after the time duration, the second connection with the second RAT; and
    operating in a dual connectivity mode for the first RAT and the second RAT based at least in part on the data traffic information, the established first connection, and the established second connection.

2. The method of claim 1, wherein transmitting, in response to the first request message, the failure message indicating the failure to add the second connection with the second cell using the second RAT is based at least in part on determining to perform the data transfer via the first connection using the first RAT.

3. The method of claim 2, further comprising:
    determining that a number of second request messages of the one or more second request messages satisfies a threshold number of request messages, wherein establishing the second connection with the second cell using the second RAT is based at least in part on the number of second request messages satisfying the threshold number of request messages.

4. The method of claim 1, wherein delaying establishing the second connection comprises:
    delaying a search process for the second cell, an acquisition process for the second cell, or both for the time duration based at least in part on determining to perform the data transfer via the first connection using the first RAT; and
    performing the data transfer via the first connection using the first RAT during the time duration.

5. The method of claim 4, further comprising:
    activating a timer based at least in part on receiving the first request message, wherein the timer runs for the time duration; and
    performing the search process for the second cell, the acquisition process for the second cell, or both based at least in part on an expiry of the timer, wherein establishing the second connection with the second cell using the second RAT based at least in part on performing the search process for the second cell, the acquisition process for the second cell, or both.

6. The method of claim 1, further comprising:
estimating a data traffic pattern for the UE based at least in part on the data traffic information for the UE for a preceding time period; and
comparing the estimated data traffic pattern to a data rate threshold, wherein determining to perform the data transfer via the first connection using the first RAT is based at least in part on the estimated data traffic pattern failing to satisfy the data rate threshold.

7. The method of claim 6, further comprising:
analyzing radio link control data, packet data convergence protocol data, application layer data traffic for one or more applications running at the UE, or a combination thereof to determine the data traffic information for the UE for the preceding time period.

8. The method of claim 1, further comprising:
identifying a criterion for performing the data transfer via the first connection using the first RAT, an indication of the time duration, or a combination thereof based at least in part on a radio resource control configuration message, a downlink control information message, a pre-configuration for the UE, or a combination thereof.

9. An apparatus for wireless communication at a user equipment (UE), comprising:
a processor;
memory coupled with the processor; and
instructions stored in the memory and executable by the processor to cause the apparatus to:
establish a first connection with a first cell using a first radio access technology (RAT);
receive a first request message to add a second connection with a second cell using a second RAT different from the first RAT;
determine to perform data transfer via the first connection using the first RAT based at least in part on data traffic information for the UE;
delay establishing the second connection with the second cell using the second RAT for at least a time duration based at least in part on determining to perform the data transfer via the first connection using the first RAT, wherein delaying establishing the second connection includes:
transmit, in response to the first request message, a failure message indicating a failure to add the second connection with the second cell using the second RAT;
receive one or more second request messages to add the second connection with the second cell using the second RAT based at least in part on the failure message;
establish, after the time duration, the second connection with the second RAT; and
operate in a dual connectivity mode for the first RAT and the second RAT based at least in part on the data traffic information, the established first connection, and the established second connection.

10. The apparatus of claim 9, wherein transmitting, in response to the first request message, the failure message indicating the failure to add the second connection with the second cell using the second RAT is based at least in part on determining to perform the data transfer via the first connection using the first RAT.

11. The apparatus of claim 10, wherein the instructions are further executable by the processor to cause the apparatus to:
determine that a number of second request messages of the one or more second request messages satisfies a threshold number of request messages, wherein establishing the second connection with the second cell using the second RAT is based at least in part on the number of second request messages satisfying the threshold number of request messages.

12. The apparatus of claim 9, wherein, to delay establishing the second connection, the instructions are executable by the processor to cause the apparatus to:
delay a search process for the second cell, an acquisition process for the second cell, or both for the time duration based at least in part on determining to perform the data transfer via the first connection using the first RAT; and
perform the data transfer via the first connection using the first RAT during the time duration.

13. The apparatus of claim 12, wherein the instructions are further executable by the processor to cause the apparatus to:
activate a timer based at least in part on receiving the first request message, wherein the timer runs for the time duration; and
perform the search process for the second cell, the acquisition process for the second cell, or both based at least in part on an expiry of the timer, wherein establishing the second connection with the second cell using the second RAT based at least in part on performing the search process for the second cell, the acquisition process for the second cell, or both.

14. The apparatus of claim 9, wherein the instructions are further executable by the processor to cause the apparatus to:
estimate a data traffic pattern for the UE based at least in part on the data traffic information for the UE for a preceding time period; and
compare the estimated data traffic pattern to a data rate threshold, wherein determining to perform the data transfer via the first connection using the first RAT is based at least in part on the estimated data traffic pattern failing to satisfy the data rate threshold.

15. The apparatus of claim 14, wherein the instructions are further executable by the processor to cause the apparatus to:
analyze radio link control data, packet data convergence protocol data, application layer data traffic for one or more applications running at the UE, or a combination thereof to determine the data traffic information for the UE for the preceding time period.

16. The apparatus of claim 9, wherein the instructions are further executable by the processor to cause the apparatus to:
identify a criterion for performing the data transfer via the first connection using the first RAT, an indication of the time duration, or a combination thereof based at least in part on a radio resource control configuration message, a downlink control information message, a pre-configuration for the UE, or a combination thereof.

17. An apparatus for wireless communication at a user equipment (UE), comprising:
means for establishing a first connection with a first cell using a first radio access technology (RAT);
means for receiving a first request message to add a second connection with a second cell using a second RAT different from the first RAT;
means for determining to perform data transfer via the first connection using the first RAT based at least in part on data traffic information for the UE;

means for delaying establishing the second connection with the second cell using the second RAT for at least a time duration based at least in part on determining to perform the data transfer via the first connection using the first RAT wherein means for delaying establishing the second connection includes:
  means for transmitting, in response to the first request message, a failure message indicating a failure to add the second connection with the second cell using the second RAT;
means for receiving one or more second request messages to add the second connection with the second cell using the second RAT based at least in part on the failure message;
means for establishing, after the time duration, the second connection with the second RAT; and
means for operating in a dual connectivity mode for the first RAT and the second RAT based at least in part on the data traffic information, the established first connection, and the established second connection.

18. The apparatus of claim 17, wherein means for transmitting, in response to the first request message, the failure message indicating the failure to add the second connection with the second cell using the second RAT is based at least in part on determining to perform the data transfer via the first connection using the first RAT.

19. The apparatus of claim 17, wherein delaying establishing the second connection comprises:
  means for delaying a search process for the second cell, an acquisition process for the second cell, or both for the time duration based at least in part on determining to perform the data transfer via the first connection using the first RAT; and
  means for performing the data transfer via the first connection using the first RAT during the time duration.

20. The apparatus of claim 17, further comprising:
  means for estimating a data traffic pattern for the UE based at least in part on the data traffic information for the UE for a preceding time period; and
  means for comparing the estimated data traffic pattern to a data rate threshold, wherein determining to perform the data transfer via the first connection using the first RAT is based at least in part on the estimated data traffic pattern failing to satisfy the data rate threshold.

21. The apparatus of claim 17, further comprising:
  means for identifying a criterion for performing the data transfer via the first connection using the first RAT, an indication of the time duration, or a combination thereof based at least in part on a radio resource control configuration message, a downlink control information message, a pre-configuration for the UE, or a combination thereof.

22. A non-transitory computer-readable medium storing code for wireless communication at a user equipment (UE), the code comprising instructions executable by a processor to:
  establish a first connection with a first cell using a first radio access technology (RAT);
  receive a first request message to add a second connection with a second cell using a second RAT different from the first RAT;
  determine to perform data transfer via the first connection using the first RAT based at least in part on data traffic information for the UE;
  delay establishing the second connection with the second cell using the second RAT for at least a time duration based at least in part on determining to perform the data transfer via the first connection using the first RAT, wherein delaying establishing the second connection includes:
    transmit, in response to the first request message, a failure message indicating a failure to add the second connection with the second cell using the second RAT;
    receive one or more second request messages to add the second connection with the second cell using the second RAT based at least in part on the failure message;
    establish, after the time duration, the second connection with the second RAT; and
    operate in a dual connectivity mode for the first RAT and the second RAT based at least in part on the data traffic information, the established first connection, and the established second connection.

23. The non-transitory computer-readable medium of claim 22, wherein the instructions are executable by the processor to:
  transmit, in response to the first request message, the failure message indicating the failure to add the second connection with the second cell using the second RAT based at least in part on determining to perform the data transfer via the first connection using the first RAT.

24. The non-transitory computer-readable medium of claim 22, wherein, to delay establishing the second connection, the instructions are executable by the processor to:
  delay a search process for the second cell, an acquisition process for the second cell, or both for the time duration based at least in part on determining to perform the data transfer via the first connection using the first RAT; and
  perform the data transfer via the first connection using the first RAT during the time duration.

25. The non-transitory computer-readable medium of claim 22, wherein the instructions are further executable by the processor to:
  estimate a data traffic pattern for the UE based at least in part on the data traffic information for the UE for a preceding time period; and
  compare the estimated data traffic pattern to a data rate threshold, wherein determining to perform the data transfer via the first connection using the first RAT is based at least in part on the estimated data traffic pattern failing to satisfy the data rate threshold.

26. The non-transitory computer-readable medium of claim 22, wherein the instructions are further executable by the processor to:
  identify a criterion for performing the data transfer via the first connection using the first RAT, an indication of the time duration, or a combination thereof based at least in part on a radio resource control configuration message, a downlink control information message, a pre-configuration for the UE, or a combination thereof.

* * * * *